(12) United States Patent (10) Patent No.: US 9,129,543 B2
Ström et al. (45) Date of Patent: Sep. 8, 2015

(54) TEXTURE COMPRESSION AND DECOMPRESSION

(75) Inventors: Jacob Ström, Stockholm (SE); Per Wennersten, Årsta (SE)

(73) Assignee: Telefonaktie L M Ericsson (publ), Stockholm (SE)

( * ) Notice: Subject to any disclaimer, the term of this patent is extended or adjusted under 35 U.S.C. 154(b) by 297 days.

(21) Appl. No.: 13/805,122

(22) PCT Filed: Jun. 18, 2010

(86) PCT No.: PCT/SE2010/050689
§ 371 (c)(1),
(2), (4) Date: Dec. 18, 2012

(87) PCT Pub. No.: WO2012/050489
PCT Pub. Date: Apr. 19, 2012

(65) Prior Publication Data
US 2013/0088504 A1   Apr. 11, 2013

(51) Int. Cl.
*G09G 5/00* (2006.01)
*G06T 9/00* (2006.01)
*H04N 1/64* (2006.01)
*H04N 19/105* (2014.01)
*H04N 19/176* (2014.01)
*H04N 19/14* (2014.01)
*H04N 19/186* (2014.01)
*H04N 19/184* (2014.01)
*H04N 19/42* (2014.01)
*H04N 19/90* (2014.01)
*H04N 19/94* (2014.01)

(52) U.S. Cl.
CPC .. *G09G 5/00* (2013.01); *G06T 9/00* (2013.01); *H04N 1/64* (2013.01); *H04N 19/105* (2014.11); *H04N 19/14* (2014.11); *H04N 19/176* (2014.11); *H04N 19/184* (2014.11); *H04N 19/186* (2014.11); *H04N 19/42* (2014.11); *H04N 19/90* (2014.11); *H04N 19/94* (2014.11)

(58) Field of Classification Search
CPC ......... G06T 11/001; G06T 15/40; G06T 7/40; H04N 19/119; H04N 19/12; H04N 19/122; H04N 19/157; H04N 19/176; H03M 7/30
See application file for complete search history.

(56) References Cited

U.S. PATENT DOCUMENTS 5,956,431 A    9/1999  Iourcha et al.
7,636,471 B2 * 12/2009  Strom et al. ............... 382/166
(Continued)

OTHER PUBLICATIONS

International Search Report for PCT/SE2010/050689, mailed Mar. 15, 2011.
(Continued)

*Primary Examiner* — Antonio A Caschera
(74) *Attorney, Agent, or Firm* — Baker Botts, LLP

(57) ABSTRACT

A compressing of a texel block consisting of two texel sub-bocks involves determining respective value codewords and table codewords for the two texel sub-blocks. The value codewords represent respective base texel values and the table codewords represent respective modifier sets comprising multiple value modifiers for modifying the base texel value associated with the given texel sub-block. Each texel in the texel block is assigned a texel index associated with one of the value modifiers of the modifier set for the texel sub-block to which the texel belongs or indicates that the base texel value of the other texel sub-block is to be used for the texel.

17 Claims, 14 Drawing Sheets

(56) References Cited

U.S. PATENT DOCUMENTS 7,751,630 B2 * 7/2010 Strom et al. ............... 382/232
7,787,691 B2 * 8/2010 Strom ............... 382/166

OTHER PUBLICATIONS

International Preliminary Report on Patentability for PCT/SE2010/050689, with 8 Amended Claims Sheets, dated Sep. 19, 2012.
Written Opinion of the International Searching Authority for PCT/SE2010/050689, mailed Mar. 15, 2011.
Written Opinion of the International Searching Authority for PCT/SE2010/050689, mailed Jun. 7, 2012.
Ström et al., "iPACKMAN: High Quality, Low-Complexity Texture Compression for Mobile Phones", Graphics Hardware, (Jul. 30-31, 2005), 8 pages.

* cited by examiner

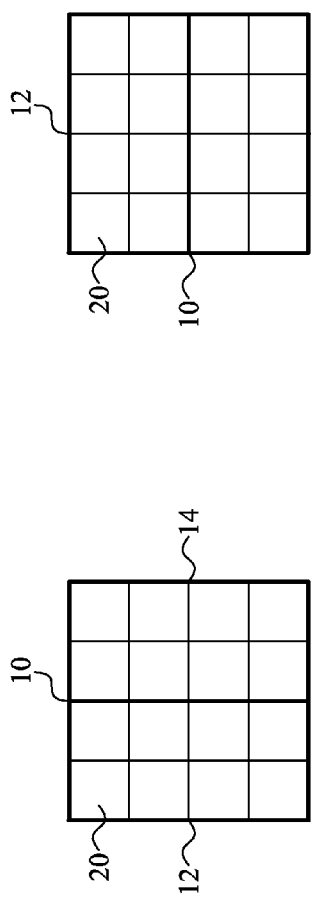
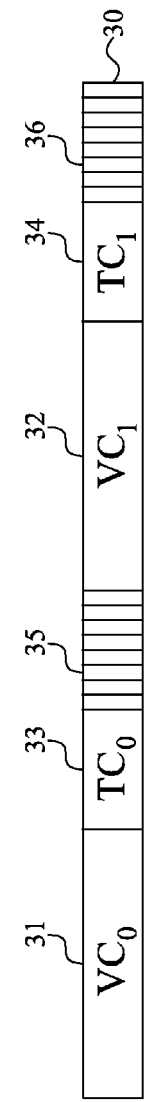
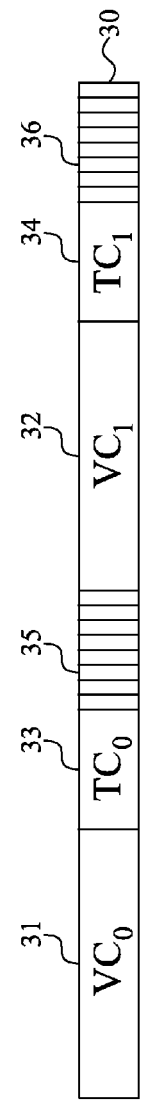
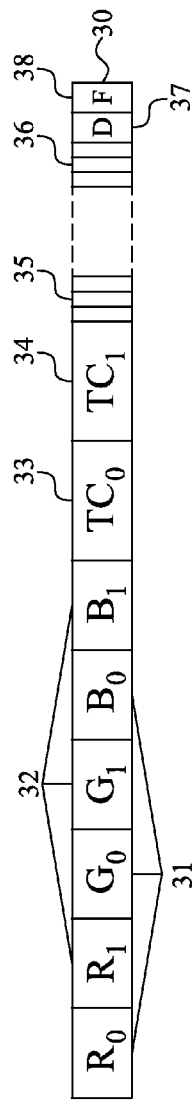
Fig. 2A
Fig. 2B
Fig. 4A
Fig. 4B

TEXTURE COMPRESSION AND DECOMPRESSION

This application is the U.S. national phase of International Application No. PCT/SE2010/050689, filed 18 Jun. 2010, which designated the U.S., the entire contents of which is hereby incorporated by reference.

TECHNICAL FIELD

The embodiments generally relate to image processing, and in particular to texture compression and decompression.

BACKGROUND

When attempting to increase performance for Graphics Processing Units (GPUs), one important method is applying various techniques to reduce memory bandwidth consumption, i.e. the bandwidth required between the memory and the GPU. Bandwidth reduction is also becoming increasingly important as the performance growth rate for processing power is much larger than performance growth for bandwidth and latency for Random Access Memories (RAMs).

Although it is sometimes possible to trade computations for memory accesses, for example by computing the value of functions rather than accessing pre-computed lookup-tables, it is likely that at some point the computation needs are satisfied, leaving the GPU idly waiting for memory access requests. Additionally, a brute force approach of simply duplicating memory banks and increasing the number of pins on memory chips may not be feasible in the long run. Finally, transferring data between the GPU and the RAM consumes large amounts of power, which is a problem, especially in mobile applications. Because of that, memory bandwidth reduction algorithms are an important area of future research.

One type of images used in graphics applications is referred to as textures. A texture is just a regular image that is used to represent the surface of a graphics primitive such as a triangle, or a quadrilateral (quad). Texture compression is one popular way of reducing bandwidth requirements. By storing textures in compressed form in memory and transferring blocks of this compressed data over the bus, texture bandwidth is substantially reduced.

Today, S3TC or DXTC [1] is a widely spread texture compression scheme that compresses texture or texel blocks of 4×4 texture elements (texels) from 384 bits to 64 bits by storing two base colors for each texel block and two bits per texel for selecting either one of the base colors or one of two colors interpolated between the base colors.

Another common texture compression scheme is ETC [2], which also targets a size of 64 bits per texel block and stores two base colors for each texel block. Unlike S3TC/DXTC, however, ETC splits the block in two and uses one of the base colors for each half. In addition, each half will use three bits to select one of eight modifier tables or sets comprising four intensity modifiers each. Finally, each texel in the texel block uses two bits to select one of the four intensity modifiers from the chosen modifier set for the relevant half of the block.

Although ETC on average outperforms S3TC it still has a limitation in that even though each half of the texel block can effectively handle texels with different luminance only a single chrominance is assigned per block half.

There is therefore still a need for texture compression and decompression systems and in particular such systems that are able to improve the chrominance processing for ETC.

SUMMARY

It is an objective to provide a compression and decompression of texel blocks.

It is a particular objective to provide a compression and decompression of texel blocks consisting of two texel sub-blocks and where the texels in at least one texel sub-block do not necessarily have the same chrominance.

These and other objectives are met by embodiments as disclosed herein.

Briefly, a compression of a texel block consisting of a first texel sub-block with multiple texels and a second texel sub-block with multiple texels involves determining a first value codeword and a second value codeword based on texel values of at least a portion of the texel block. The first value codeword is a representation of a first base texel value for the multiple texels of the first texel sub-block. The second value codeword is a corresponding representation of a second base texel value for the multiple texels of the second texel sub-block. A first table codeword is provided for the first texel sub-block. This first table codeword is a representation of a first modifier set of multiple value modifiers for modifying the first base texel value represented by the first value codeword. A second table codeword is provided for the second table codeword.

A respective texel index is selected for each texel in the first texel sub-block. The texel index is either associated with a value modifier of the first modifier set or indicates that a base texel value for a texel is based on the second base texel value represented by the second value codeword. This means that if the texel index is associated with a value modifier a base texel value for a texel is obtained by modifying the first base texel value with the value modifier. However, if the texel index instead indicates that it is not associated with any value modifier the base texel value for the texel is determined based on the second texel value that is actually determined for and assigned to the other texel sub-block.

Respective texel indices are also selected for the texels in the second texel block. A compressed representation of the texel block is stored and comprises the first and second value codewords, the first and second table codewords and the texel indices.

Thus, the embodiments allow texels from at least one of the texel sub-blocks to use the value codeword and the base texel value determined for the other texel sub-block. As a consequence, it is possible to select among different base texel values within a single texel sub-block, for instance by selecting between different chrominances within a single texel sub-block if the texel values represent colors.

A system for compressing a texel block comprises a value codeword determiner configured to determine the first and second color codewords as defined above based on texel values of at least a portion of the texel block. A table codeword provider is configured to provide the first table codeword as defined above for the first texel sub-block and the second table codeword as defined above for the second texel sub-block. A texel index selector is configured to select a texel index for each texel in the texel block. In more detail the texel index selector selects, for each texel within the first texel sub-block, a texel index associated with a value modifier of the first modifier set represented by the first table codeword or indicating that the base texel value of the texel is based on the second base texel value represented by the second value codeword.

A memory of the system is configured to store a compressed representation of the texel block comprising the first and second value codewords, the first and second table codewords and the texel indices.

A method of processing or decompressing a compressed representation of a texel block as defined above comprises determining a first base texel value for the multiple texels in the first texel sub-block of the texel block based on the first value codeword. The second value codeword is correspondingly employed for determining a second base texel value for the multiple texels of the second texel sub-block of the texel block. The first table codeword is employed for providing a first modifier set of multiple value modifiers for modifying the first base texel value. The texel value for a texel in the first texel sub-block is determined either based on the first base texel value and a value modifier or based on the second base texel value. The choice is made depending on the value of the texel index associated with the texel. Thus, if the texel index has a defined value the base texel value of the texel is based on the second base texel value otherwise it is determined by modifying the first base texel value with the value modifier from the first modifier set associated with the texel index.

A system for processing a compressed representation of a texel block comprises a base value determiner configured to determine the first base texel value and the second base texel value based on the first value codeword and the second value codeword, respectively. A set provider is configured to provide the first modifier set with multiple value modifiers based on the first table codeword. The system also comprises a value determiner configured to determine a texel value for a texel in the first texel sub-block based on the second base texel value if the texel index has a defined index value or otherwise by modifying the first base texel value with a value modifier selected from the first modifier set based on the texel index.

BRIEF DESCRIPTION OF THE DRAWINGS

The invention, together with further objects and advantages thereof, may best be understood by making reference to the following description taken together with the accompanying drawings, in which:

FIGS. 2A and 2B illustrate embodiments of a texel block consisting of two texel sub-blocks;

FIGS. 4A and 4B illustrate compressed representations of a texel block according to different embodiments;

DETAILED DESCRIPTION

Figure 1:
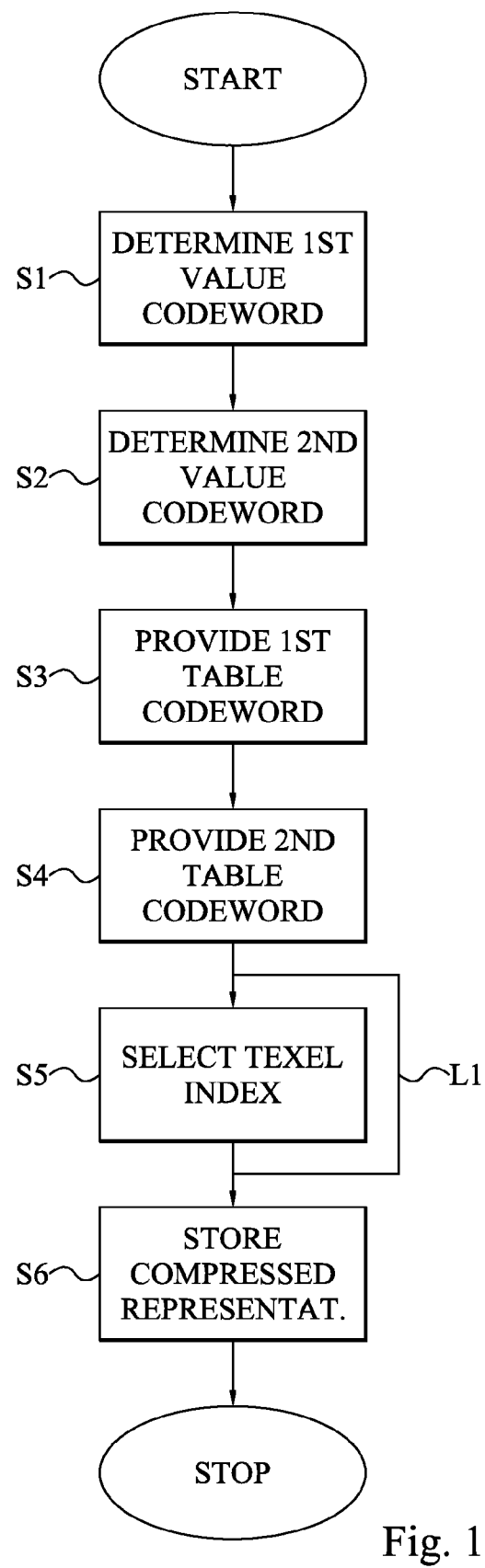
FIG. 1 is a flow diagram illustrating a method of compressing a texel block according to an embodiment.

Throughout the drawings, the same reference numbers are used for similar or corresponding elements.

The present embodiments are configured to enable compression and decompression of images and textures and in particular compression and decompression of texture element (texel) blocks.

The embodiments are well adapted for usage with three-dimensional (3D) graphics, such as games, 3D maps and scenes, 3D messages, e.g. animated messages, screen savers, man-machine interfaces (MMIs), etc., but is not limited thereto. Thus, the embodiments could also be employed for decoding other types of images or graphics, e.g. one-dimensional (1D), two-dimensional (2D) or 3D images and textures.

A 3D graphics rendering process typically comprises three sub-stages. Briefly, a first stage, the application stage, creates several triangles. The corners of these triangles are transformed, projected and lit in a second stage, the geometry stage. In a third stage, the rasterization stage, images, often denoted textures, can be "glued" onto the triangles, increasing the realism of the rendered image. The third stage also performs sorting using a z-buffer.

However, rendering of textures, and in particular 3D images and graphics, is a computationally expensive task in terms of memory bandwidth and processing power required for the graphic systems. For example, textures are costly both in terms of memory, the textures must be placed on fast on-chip memory, and in terms of memory bandwidth, a texture can be accessed several times to draw a single pixel. Also multiple, i.e. at least two, textures can sometimes be needed in order to draw a pixel.

In order to reduce the bandwidth and processing power requirements, a texture compressing or encoding method or system is typically employed. Such a compressing system should result in more efficient usage of expensive on-chip memory and lower memory bandwidth during rendering and, thus, in lower power consumption and/or faster rendering. This reduction in bandwidth and processing power requirements is particularly important for thin clients, such as mobile units and telephones, with a small amount of memory, little memory bandwidth and limited power, i.e. powered by batteries.

Also other rendering techniques, such as ray tracing, typically employ texture. The embodiments as disclosed herein can therefore be applied to such rendering techniques, including ray tracing.

In the art textures are divided into so-called texel blocks, each comprising a number of texels. Such a texel block is typically rectangular or quadratic, such as a size of $M_R \times M_C$ texels, where $M_R$, $M_C$ are positive integer numbers with the proviso that both $M_R$ and $M_C$ are not simultaneously one. Preferably, $M_R=2^{m_R}$ and $M_C=2^{m_C}$, where $m_R$, $m_C$ are positive integers. In a typical implementation $M_R=M_C$ and preferred such block embodiments could be 4×4 texels.

In the art, pixel or image element is sometimes employed to denote a texture element of a texture. In the following description, texel is, though, employed to denote a texture element of a texture and pixel is used to denote a picture element generated from such texels, for instance, in connection with rasterization.

A texel is associated with a texel value and a pixel is associated with a pixel value. The texel and pixel values can advantageously be color values. A color value can be represented in various color formats, such as red, green, blue (RGB) color or as luminance and chrominance. Note here that texel values are not necessarily colors. It is also possible that a texel represents a gray value, a normal vector, Z value or in principle any kind of information that can be used during rendering and that is amenable to the type of compression described herein. With the advent of general purpose GPU-programming, it is even possible that the information will not be used for rendering, but for general purpose computation.

Compression

The compression of a texel block involves determining a number of parameters or codewords that are employed as coded representation of the texel block and its texel values. In addition, the total size of these parameters in terms of number of bits should meet the preferably fixed bit budget assigned to each compressed or encoded texel block and should be smaller than the total size of the original uncoded texel values of the texel block.

Hence, according to an embodiment a texel block is encoded by dividing the image or texture into a plurality of texel blocks, wherein each texel block comprises a number of image elements such as texels and each texel has a texel value. According to the embodiments, the texel block consists of or is divided into a first texel sub-block and a second texel sub-block. These two sub-blocks each comprises multiple texel values and collectively form the texel block. FIGS. 2A and 2B illustrate this concept. In the figures, the texel block 10 is illustrated as a 4×4 texel block comprising 16 texels 20. The texel block 10 consists of the first texel sub-block 12 and the second texel sub-block 14 which can be oriented next to each other as in FIG. 2A or on top of each other as in FIG. 2B. In the figures, the two texel sub-blocks 12, 14 are of the same size and comprise 4×2 or 2×4 texels 20 each. This is generally preferred but the embodiments are not limited thereto. Thus, it is indeed possible to have a first texel sub-block 12 that has a different size in terms of the number of including texels 20 of the texel block 10 as compared to the second texel sub-block 14.

The particular sizes of the texel block 10 and texel sub-blocks 12, 14 as illustrated in FIGS. 2A and 2B should be seen as preferred but non-limiting examples of texel block and texel sub-blocks and the embodiments are not limited thereto.

FIG. 1 is a flow diagram illustrating a method of compressing a texel block consisting of two texel sub-blocks. The method starts in step S1 where a first value codeword that is a representation of a first base texel value is determined for the multiple texels in the first texel sub-block. The first value codeword is determined based on the texel values of at least a portion of the multiple texels of the texel block. In a particular embodiment, the first value codeword is determined in step S1 based on the texel values of the texels in the first texel sub-block or at least based on a portion thereof. Non-limiting examples include determining the first value codeword to be a representation of the average or median texel value of the multiple texels of the first texel sub-block. A further example includes, as is discussed further herein, testing all possible values of the first value codeword and selecting the one that leads to the smallest error, i.e. difference between original texel values of the texel block and reconstructed texel values obtained following compression and decompression of the texel block.

Step S2 determines a second value codeword that is a representation of a second base texel value for the multiple texels of the second texel sub-block. The second value codewords is determined in step S2 based on the texel values of at least a portion of the multiple texels of the texel block, such as the texels of the second texel sub-block or at least a portion thereof. Basically, the determination of the second value codeword in step S2 can be conducted according to similar techniques as the determination of the first value codeword in step S1. The portion of the multiple texels employed to determine the second value codeword, denoted second portion herein, can be equal to or different from the portion of the multiple texels used to determine the first value codeword, denoted first portion herein.

Steps S1 and S2 can be conducted serially as illustrated in the figure or with the determination of the second value codeword prior to determination of the first value codeword. Alternatively, the two steps can be conducted in parallel and optionally together in a combined optimization and determination of value codewords that minimize the error induced by the compression.

The value codewords are preferably compressed versions of the base texel values implying that the size of a value codeword in terms of the number of bits is lower than the size of the corresponding base texel value. Alternatively, there is a one-to-one correspondence between the value codeword size and the base texel value size.

The following steps S3 and S4 provide table codewords for the two texel sub-blocks. In more detail, step S3 provides a first table codeword for the first texel sub-block. This first table codeword is a representation of a first modifier set or first modifier table of multiple value modifiers that are employed, during decompression, for modifying the first base texel value represented by the first value codeword. Thus, the value modifiers are defined and employed to generate additional texel values from the first base texel value.

The first table codeword can comprise the relevant modifier values of the first modifier set. For instance assume that the first modifier set is defined as $[-\alpha, 0, \alpha]$, where $\alpha$ is a defined modifier value. In such a case, it is enough to define the value $\alpha$ by the first table codeword since the other value modifiers of the first modifier set can be derived therefrom, i.e. $-\alpha$, or could be fixed, such as zero. However, it is generally preferred to use a table or codebook of multiple predefined modifier sets to select among. In such a case, the first table codeword is employed in a table look up procedure and is associated with and allows identification of one of the modifier sets from the table. Thus, given the value of the first table codeword provided in step S3 the first modifier set and the value modifiers to use for the first texel sub-block are obtained from the table. This latter embodiment of table codeword is generally preferred over directly representing the value modifiers or a portion thereof in the first table codeword since the total size of the table codeword can typically be kept smaller when employed for table look-up as compared to representing value modifiers.

Step S4 provides a second table codeword that is to be used for the second texel sub-block.

Steps S3 and S4 can be conducted after each other as illustrated in the figure or in the reverse order. Alternatively, they can be performed at least partly in parallel and optionally together.

The provision of table codewords in steps S3 and S4 can be conducted in an exhaustive search, in particular if table codewords are used as table look-ups since then a limited number of combinations need to be tested. For instance, a table codeword of three bits means that eight different modifier sets are available and each and every one of these eight modifier sets can be tested for the respective texel sub-blocks in order to find the one that minimizes the error imposed by the lossy compression.

In the prior art [2], the modifier sets that are available and can be selected for a texel sub-block are limited to comprise four value modifiers each and are generally in the form of $[-\alpha, -\beta, \beta, \alpha]$. However, according to the invention the table codeword determined for at least one of the texel sub-blocks does not only define multiple value modifiers but also indicates that the base texel value for a texel of the texel sub-block should be based on the base texel value of the other texel sub-block of the texel block. In other words, a first table codeword provided for the first texel sub-block could define multiple value modifiers and additionally indicate that the base texel value for a texel within the first texel sub-block with a certain texel index should not be equal to the first base texel value represented by the first value codeword but rather be based on the second base texel value that is represented by the second value codeword determined for the second texel sub-block.

Thus, at least one of the texel sub-blocks has a table codeword that allows using the value codeword of the other texel sub-block for its texels even though the texel sub-block should normally use its own value codeword and the other value codeword is determined for the other texel sub-block. As used herein, the sub-block for which such a table codeword is selected is denoted the first texel sub-block. The table codeword provided for the other texel sub-block, i.e. the second texel sub-block, can be according to various embodiments as is further disclosed herein.

If the texel values, for instance, represent colors this dual function of the first table codeword allows the texels of the first texel sub-block to use both a first color codeword representing a first base color and a second color codeword representing a second base color. Thus, the texel sub-block is thereby not limited to use a single chrominance but can actually handle the case with multiple chrominances in the texel sub-block.

A next step S5 selects a texel index for each texel in the texel block as schematically illustrated by the line L1. For the texels in the first texel sub-block step S5 involves selecting a texel index associated with a value modifier of the first modifier set or indicating that the base texel value for the texel is based on the second base texel value. This means that for those texels of the first texel sub-block where a texel index associated with a value modifier is selected, the texel value will be based on and preferably equal to a modified version of the first base texel value represented by the first value codeword. However, for any other texels of the first texel sub-block where the texel index selected in step S5 is not associated with a value modifier of the first modifier set, the texel value is instead based on, such as equal to, the second base texel value represented by the second value codeword.

Step S5 also involves selecting respective texel indices for the texels in the second texel sub-block.

The selection of texel index in step S5 is preferably conducted in an error minimization procedure, where the different available texel indices are tested for the texels and the set of texel indices that minimizes the error when compressing the texel block is selected.

The final step S6 stores a compressed representation of the texel block or compressed texel block comprising the first value codeword from step S1, the second value codeword from step S2, the first table codeword provided in step S3, the second table codeword provided in step S4 and the texel indices selected in step S5.

FIG. 4A schematically illustrates such a compressed representation 30 of the texel block. In the figure $VC_0$ indicates the first value codeword 31, $VC_1$ represents the second value codeword 32, $TC_0$ is the first table codeword 33 and $TC_1$ denotes the second table codeword 34. Reference numbers 35 and 36 indicate the texel indices of the first and second texel sub-block, respectively. The actual order of the elements of the compressed representation 30 must not necessarily be arranged as illustrated in the figure. In clear contrast, other arrangements of the value codewords 31, 32, the table codewords 33, 34 and the texel indices 35, 36 are possible and within the scope of the embodiments.

If the total size of the compressed representation 30 is fixed such as 64 bits, each texel index 35, 36 can be a 2-bit index, the table codewords 33, 34 could be 3-bit codwords thereby leaving 13 bits for each of the value codewords 31, 32. If the layout of the texel block illustrated in FIGS. 2A and 2B are possible, one bit, a so-called flip bit, is needed to indicate whether the two texel sub-blocks 12, 14 should be arranged as in FIG. 2A or as in 2B. This extra bit can then be taken from one of the value codewords 31, 32. In such a case, the compressed representation 30 additionally comprises the flip bit.

Figure 3A:
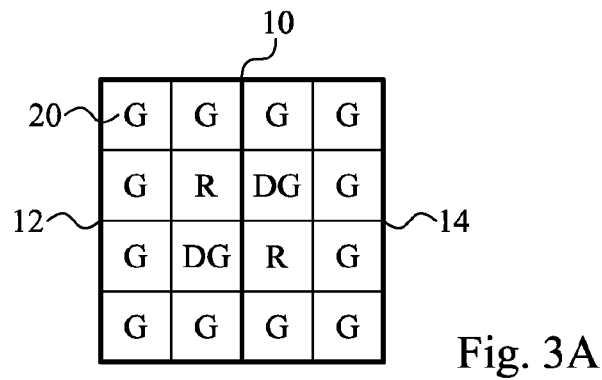
FIGS. 3A-3D illustrate an original texel block (A), a texel block generated according to ETC (B), texel blocks generated according to different embodiments (C and D)

FIG. 3A illustrates an original, i.e. uncompressed texel block 10 where the texel values of the texels 20 represent different texel values and where G denotes green, R denotes red and DG, indicates dark green. As can be seen from the figure most of the texels 20 in the texel block 10 have the same color, i.e. green. However, each texel sub-block 12, 14 additionally comprises two texels 20 with other texel values in the form of red and dark green.

Figure 3B:
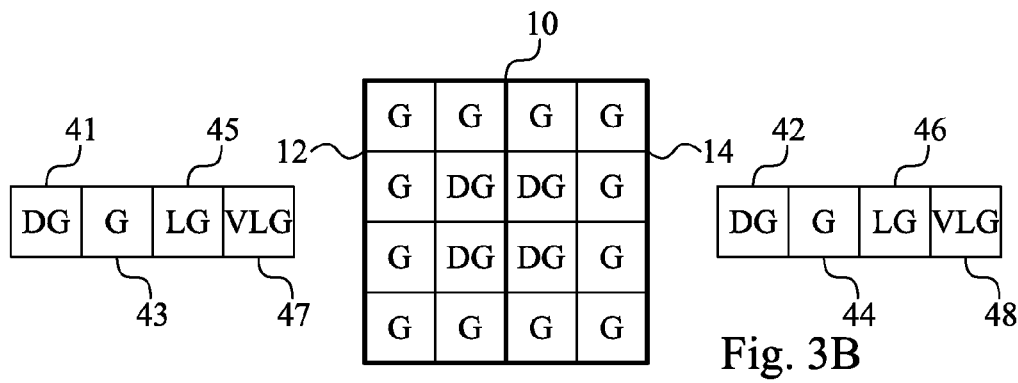

FIG. 3B illustrates the result following compression and decompression according to the prior art [2] of the texel block 10 in FIG. 3A. According to the prior art technique a respective base color is determined for both texel sub-blocks. Since the majority of the texels 20 in both sub-blocks 12, 14 have the same green colors (6 out of 8 texels 20 in each texel sub-block 12, 14) this green color will influence the base color more than the dark green and red texel per texel sub-block 12, 14. Furthermore, since the distribution of colors are the same in both texel sub-blocks 12, 14, the two base colors and the two intensity modifier sets selected for the texel block 10 will be identical. Reference numbers 41-48 represent the different intensity modified colors that are available for each texel sub-block 12, 14. In this case LG stands for light green and VLG is very light green. As is seen in the figure the same intensity modified colors 41-48 will be available in both texel sub-blocks 12, 14. Furthermore, since only a single chrominance is possible according to the prior art in [2] per sub-block it will not be possible to accurately represent red texels. These texels will instead be assigned any of the green shades, such as dark green 41, 42 as illustrated in the figure. The resulting texel block 10 following decompression according to the prior art technique is illustrated in the middle of FIG. 3B. Thus, in this case only a single chrominance is used per texel sub-block 12, 14 (actually the same single chrominance is used in both texel sub-blocks 12, 14). There will therefore be a significant and visually identifiable error when comparing the original texel block 10 in FIG. 3A and the texel block 10 obtainable according to the prior art.

In FIG. 3B and according to the prior art technique the intensity modifier sets provided for the texel sub-block 12, 14 only comprises intensity modifiers that achieves a modification of the intensity and luminance of the (green) base color. It is, thus, not possible to achieve another chrominance for the texel sub-block 12, 14.

Figure 3C:
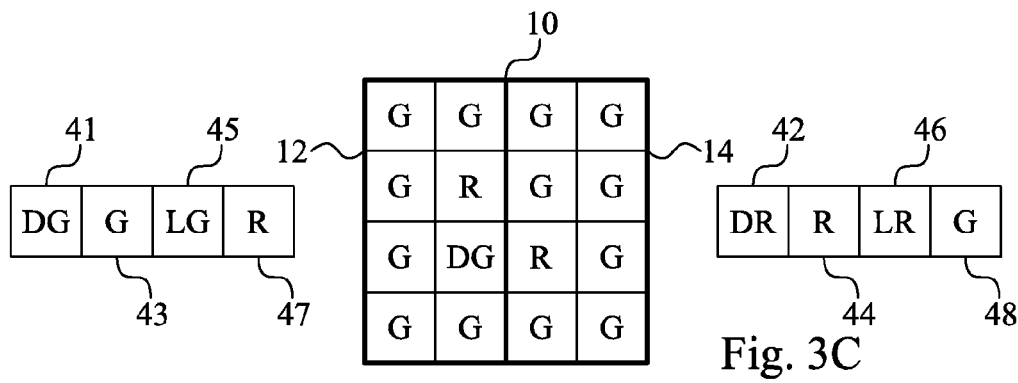

FIG. 3C illustrates an embodiment as disclosed herein that solves these problems with the prior art technique. In this case the table codeword does not only represent a modifier set with multiple intensity modifiers, i.e. value modifiers, that can modify the base color, i.e. base texel value, of the texel sub-block 12, 14. In clear contrast, the table codeword additionally indicates that it is possible to use the base color of the other texel sub-block for the texels if desired instead of selecting an intensity modifier that is used for modifying the base color of the current texel sub-block.

Thus, assume in FIG. 3C that the first texel sub-block 12 is assigned a color codeword, i.e. value codeword, that is representation of a green base color whereas the second texel sub-block 14 is instead assigned a color codeword that represents a red base color. The texels 20 of the first texel sub-block 12 can then select among an intensity modified version of the green base color, i.e. dark green 41, green 43 or light green 45, or the red base color 47 of the second texel sub-block 14. In a particular embodiment, the table codeword of the second texel sub-block 14 correspondingly defines a second modifier set with multiple intensity modifiers and an indication that the green base color of the first texel sub-block 12 can be used. Thus, the texels 20 of the second texel sub-block can thereby select among intensity modified red colors, i.e. dark red (DR) 42, red 44, light red (LR) 46, or the green base color 48 of the first texel sub-block 12.

The result following compression and decompression according to this particular embodiment is present in the middle of FIG. 3C. As compared to the prior of FIG. 3C it is now possible to have two different chrominances in at least one of the two texel sub-blocks 12, 14 (in this particular example it is actually possible to have two chrominances in both texel sub-blocks 12, 14). There is actually only one texel in the second sub-block 14 that is not as correctly represented as one might would like, i.e. green instead of dark green. Despite this shortcoming the improvement as compared to the prior art of FIG. 3B is still significant.

The provision of the table codeword for the second texel sub-block in FIG. 1 can be performed according to various embodiments.

In a first embodiment, step S4 involves providing a second table codeword for the second texel sub-block and where the second table codeword is a representation of a second modifier set of multiple modifier values. These modifier values of the second modifier set are to be used during decompression for modifying the second base texel value represented by the second value codeword.

According to this embodiment step S5 involves selecting, for each texel in the second texel sub-block, a texel block associated with one of the value modifiers of the second modifier set or indicating that the base texel value for that texel is based on the first base texel value. This embodiment was previously discussed in connection with FIG. 3C. Thus, the texels in the second texel sub-block can either be assigned a texel index that indicates that the second base texel value is to be modified by a modifier value to get a reconstructed texel value for that texel. Alternatively, the texel index of the texel indicates that the base texel value and thereby the reconstructed texel value for that texel is instead based on the first base texel value represented by the first value codeword.

Table 1 below is an example of modifier sets that can be used according to an embodiment where the texel values of the texels represent RGB colors and the value modifiers are intensity modifiers.

TABLE 1

| | Modifier sets | | | |
|---|---|---|---|---|
| | Modifier set | | | |
| Table codeword | $11_{bin}$ | $10_{bin}$ | $00_{bin}$ | $01_{bin}$ |
| $000_{bin}$ | −12 | −4 | 4 | 12 |
| $001_{bin}$ | −36 | −8 | 8 | 36 |
| $010_{bin}$ | −72 | −28 | 28 | 72 |
| $011_{bin}$ | −192 | −44 | 44 | 192 |
| $100_{bin}$ | −12 | 0 | X | 12 |
| $101_{bin}$ | −32 | 0 | X | 32 |
| $110_{bin}$ | −64 | 0 | X | 64 |
| $111_{bin}$ | N/A | N/A | N/A | N/A |

In the first embodiment discussed above, the table codewords for the first and second texel sub-blocks are both selected among the table codewords 4-6 ($100_{bin}$-$110_{bin}$). These modifier sets comprise three value modifiers each and an indication (X) specifying that the base texel value of the texel is based on the base texel value determined for the other texel sub-block. Thus, if the texel index selected for a texel is one of $11_{bin}$, $10_{bin}$ or $01_{bin}$ a value modifier associated with this texel index is employed for modifying the base texel value represented by the value codeword determined for the texel sub-block to which the texel belongs. However, if the texel index is instead $00_{bin}$ the base texel value represented by the value codeword determined for the other texel sub-block to which the texel does not belong is instead used for that texel.

Table 2 is a particular example of a table with modifier sets that are suitable for usage in connection with color as texels. Thus, in this example, each texel has a RGB color value and the value modifiers of the modifier sets are intensity modifiers for modifying the intensities of the first or second base color as is further described herein. In Table 2 ($r_0$, $g_0$, $b_0$) denotes the first base color and ($r_1$, $g_1$, $b_1$) represents the second base color. The table illustrates the choices that are possible for the first texel sub-block. A corresponding table for the second texel sub-block is obtained by switching places of ($r_0$, $g_0$, $b_0$) and ($r_1$, $g_1$, $b_1$) in Table 2.

TABLE 2

| | Modifier sets | | | |
|---|---|---|---|---|
| Table codeword | Modifier set | | | |
| | $11_{bin}$ | $10_{bin}$ | $00_{bin}$ | $01_{bin}$ |
| $000_{bin}$ | ($r_0$, $g_0$, $b_0$) −12 * (1, 1, 1) | ($r_0$, $g_0$, $b_0$) −4 * (1, 1, 1) | ($r_0$, $g_0$, $b_0$) +4 * (1, 1, 1) | ($r_0$, $g_0$, $b_0$) +12 * (1, 1, 1) |
| $001_{bin}$ | ($r_0$, $g_0$, $b_0$) −36 * (1, 1, 1) | ($r_0$, $g_0$, $b_0$) −8 * (1, 1, 1) | ($r_0$, $g_0$, $b_0$) +8 * (1, 1, 1) | ($r_0$, $g_0$, $b_0$) +36 * (1, 1, 1) |
| $010_{bin}$ | ($r_0$, $g_0$, $b_0$) −72 * (1, 1, 1) | ($r_0$, $g_0$, $b_0$) −28 * (1, 1, 1) | ($r_0$, $g_0$, $b_0$) +28 * (1, 1, 1) | ($r_0$, $g_0$, $b_0$) +72 * (1, 1, 1) |
| $011_{bin}$ | ($r_0$, $g_0$, $b_0$) −192 * (1, 1, 1) | ($r_0$, $g_0$, $b_0$) −44 * (1, 1, 1) | ($r_0$, $g_0$, $b_0$) +44 * (1, 1, 1) | ($r_0$, $g_0$, $b_0$) +192 * (1, 1, 1) |
| $100_{bin}$ | ($r_0$, $g_0$, $b_0$) −12 * (1, 1, 1) | ($r_0$, $g_0$, $b_0$) + 0 * (1, 1, 1) | ($r_1$, $g_1$, $b_1$) | ($r_0$, $g_0$, $b_0$) +12 * (1, 1, 1) |

TABLE 2-continued

| | Modifier sets | | | |
|---|---|---|---|---|
| Table | | Modifier set | | |
| codeword | $11_{bin}$ | $10_{bin}$ | $00_{bin}$ | $01_{bin}$ |
| $101_{bin}$ | $(r_0, g_0, b_0) -32 * (1, 1, 1)$ | $(r_0, g_0, b_0) +0 * (1, 1, 1)$ | $(r_1, g_1, b_1)$ | $(r_0, g_0, b_0) +32 * (1, 1, 1)$ |
| $110_{bin}$ | $(r_0, g_0, b_0) -64 * (1, 1, 1)$ | $(r_0, g_0, b_0) +0 * (1, 1, 1)$ | $(r_1, g_1, b_1)$ | $(r_0, g_0, b_0) +64 * (1, 1, 1)$ |
| $111_{bin}$ | N/A | N/A | N/A | N/A |

In a second embodiment, step S4 of FIG. 1 instead involves providing a second table codeword that is a representation of a second modifier set of multiple value modifiers for modifying the second base texel value. In clear contrast to the first embodiment discussed above, the second table codeword does not indicate that the first base texel value can be selected for any of the texels in the second texel sub-block.

This embodiment corresponds to one of the modifier sets 0-3 ($000_{bin}$-$011_{bin}$) in Table 1 above. Compared to the previously described embodiment all possible texel indices will in this case be represented by a respective value modifier that is to be applied to the second base texel value. As a consequence, these modifier sets will comprise one additional modifier value as compared to the modifier sets 4-6. It is then not possible to achieve texel values of different chrominance in the texel sub-block.

Reference is once more made to FIG. 3C. In this embodiment it is not guaranteed that the same set of modified texel values can be obtained for both texel sub-blocks 12, 14. As a consequence, it might not be possible to correctly represent the texel values of a texel block 10 when both texel sub-blocks 12, 14 contain similar texel value (color) distributions as in FIG. 3A.

This problem is solved in an embodiment where the table codeword of a texel sub-block 14 indicates that the value codeword determined for the other texel sub-block 12 is to be used as value codeword for the current texel sub-block 14 and that the table codeword provided for the other texel sub-block 12 and the modifier set represented by this table codeword is to be used as table codeword for the current texel sub-block 14 when generating reconstructed texel values.

Figure 3D:
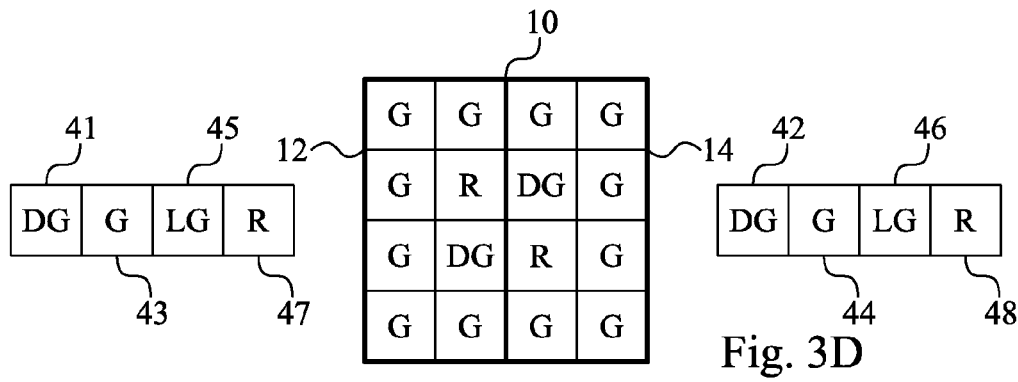

The result is then that the modified texel values 41-48 obtained for the two texel sub-blocks 12, 14 will be the same as illustrated in FIG. 3D. In the example illustrated in FIG. 3D both the first and second texel sub-block will thereby have access to the dark green 41, 42, green 43, 44, light green 45, 46 and red 47, 48 colors and thereby the original texel block 10 in FIG. 3A can be accurately reconstructed as illustrated in the middle of FIG. 3D.

This embodiment is indicated by the table codeword 7 ($111_{bin}$) in Table 1 above. Thus, in such a case the value codeword and table codeword of the other texel sub-block in the texel block will be used for the current texel sub-block.

If the table codeword of a texel sub-block is one of table codeword 4-6 in Table 1 and the texel index of a texel is $00_{bin}$ the base texel value of that texel is to be based on the base texel value represented by the value codeword determined for the other texel sub-block. In a particular embodiment, the base texel value of the texel is then equal to the base texel value represented by the value codeword determined for the other texel sub-block.

In an alternative approach the base texel value of the texel is equal to the base texel value represented by the value codeword determined for the other texel sub-block modified with a defined value modifier. In such a case, at least one of modifier sets for table codewords 4-6 could be changed from the $[-\alpha, 0, X, \alpha]$ to be in the format $[-\beta, \beta, X+\chi, X-\chi]$, where $\alpha, \beta, \chi$ represent positive numbers. Thus, if such a modifier set is used and the texel index of a texel indicates $X+\chi$ or $X-\chi$ the base texel value of the other texel sub-block should be modified by $+\chi$ or $-\chi$ and used as reconstructed texel value for that texel.

In the case of colors as texel values, the intensity modified colors with such a modifier set would then be $(r_0, g_0, b_0)-\beta*(1,1,1)$; $(r_0, g_0, b_0)+\beta*(1,1,1)$; $(r_1, g_1, b_1)+\chi*(1,1,1)$; $(r_1, g_1, b_1)+\chi*(1,1,1)$, for the first texel sub-block.

Yet another embodiment is to use a base texel value of the texel that is equal to a defined combination of the base texel value of the current texel sub-block and the base texel value of the other texel sub-block. Thus, a combination of the base texel values represented by the value codewords will be used in this case. For instance, the average of the two base texel values or some other linear combination thereof could be used. It is actually possible to utilize multiple different linear combinations. Thus, one of the modifier sets of table codeword 4-6 could then imply a first linear combination if the texel index indicates X, another of the modifier sets of these table codewords could then use a second, different linear combination if the texel index indicates X and so on. A further alternative is if at least one of modifier sets for table codewords 4-6 could be changed from the $[-\alpha, 0, X, \alpha]$ to be in the format $[-\beta, \beta, X1, X2]$, where X1 and X2 represents different linear combinations of the two base texel values.

An example of this concept as applied to colors as texel value could result in the following intensity modified colors: $(r_0, g_0, b_0)-\beta*(1,1,1)$; $(r_0, g_0, b_0)+\beta*(1,1,1)$; $\alpha(r_0, g_0, b_0)+(1-\alpha)(r_1, g_1, b_1)$; $\gamma(r_0, g_0, b_0)+(1-\gamma)(r_1, g_1, b_1)$, for the first texel sub-block.

This embodiment of having a combination of base color values can be combined with the embodiment that uses a defined value modifier. Thus, a defined value modifier can be used to modify the combination of the two base color values, such as $\alpha(r_0, g_0, b_0)+(1-\alpha)(r_1, g_1, b_1)$; $\beta(r_0, g_0, b_0)+(1-\beta)(r_1, g_1, b_1)$; $[\alpha(r_0, g_0, b_0)+(1-\alpha)(r_1, g_1, b_1)]+\gamma(1,1,1)$; $\beta(r_0, g_0, b_0)+(1-\beta)(r_1, g_1, b_1)+\gamma(1,1,1)$. Alternatively, only one of the base colors is intensity modified: $\alpha(r_0, g_0, b_0)+(1-\alpha)(r_1, g_1, b_1)$; $\beta(r_0, g_0, b_0)+(1-\beta)(r_1, g_1, b_1)$; $\alpha(r_0, g_0, b_0)+(1-\alpha)[(r_1, g_1, b_1)+\gamma(1,1,1)]$; $\beta(r_0, g_0, b_0)+(1-\beta)[(r_1, g_1, b_1)+\gamma(1,1,1)]$. In yet another approach, different intensity modifiers are possible for the two base colors: $\alpha(r_0, g_0, b_0)+(1-\alpha)(r_1, g_1, b_1)$; $\beta(r_0, g_0, b_0)+(1-\beta)(r_1, g_1, b_1)$; $\alpha[(r_0, g_0, b_0)+\delta(1,1,1)]+(1-\alpha)[(r_1, g_1, b_1)+\gamma(1,1,1)]$; $\beta[(r_0, g_0, b_0)+\delta(1,1,1)]+(1-\beta)[(r_1, g_1, b_1)+\gamma(1,1,1)]$.

Tables 1 and 2 listed above should merely be seen as illustrative examples of tables with modifier sets that can be used in a particular embodiment. The embodiments are not limited thereto but can use other modifier sets comprising other value modifiers, more or less value modifier values per modifier set, more or less modifier sets and different organization of the modifier sets in the table and modifier values within the modifier sets.

The actual values of the value modifiers are further dependent on the particular texel values that the texels of the texel block comprises. Thus, if the texel values are RGB colors different value modifiers are typically employed as compared to a texel block with normals or grayscale values as texel values.

The actual value modifiers of the modifier sets can be determined in an optimization procedure. Such an optimization procedure can, for instance, start from random numbers and then optimizing them by minimizing the error for a set of training images or textures.

Returning to FIG. 1, steps S1 to S6 are preferably repeated for all texel blocks obtained when decomposing a texture. The result is then a sequence or file of compressed representations of texel blocks. The compressed texture could then be stored in a memory until a subsequent rendering, e.g. display, of an image. Furthermore, the compressed representations of the texel blocks could be provided as a signal to a transmitter for (wireless or wired) transmission to another unit.

It is pointed out that for different texel blocks of a texture different combinations of table codwords could be provided. Thus, texel blocks can be compressed according to various embodiments as previously disclosed depending on the particular distribution of original texel values for the texel blocks.

In a particular embodiment, the texel values are colors, preferably RGB colors. In such a case, step S1 of FIG. 1 comprises determining, based on colors of at least a portion of the multiple texels in the texel block, a first color codeword that is a representation of a first base color for the multiple texels in the first texel sub-block. Step S2 involves determining, based on colors of at least a portion of the multiple texels in the texel block a second color codeword that is a representation of a second base color for the multiple texels in the second texel sub-block. Step S3 provides, for the first texel sub-block, a first table codeword that is a representation of a first modifier set comprising multiple intensity modifiers for modifying the intensity of the first base color. Step S4 provides a second table codeword for the second texel sub-block. Step S5 selects, for each texel in the first texel sub-block, a texel index associated with an intensity modifier of the first modifier set or indicating that a base color for the texel is based on the second base color. Additionally, step S5 selects, for each texel in the second texel sub-block, a texel index. Finally step S6 stores a compressed representation of the texel block comprising the first and second color codewords, the first and second table codewords and the texel indices.

The embodiments as disclosed herein can advantageously be used in connection with the ETC scheme [2]. As is further described herein, a compressed representation of a texel block generated according to the ETC scheme comprises the previously mentioned flip bit 38 see FIG. 4B. This flip bit 38 indicates whether vertical, such as flip bit=$0_{bit}$ and FIG. 2A, or horizontal, such as flip bit=$1_{bin}$ and FIG. 2B, orientation is used. Additionally, there is a possibility in ETC [2] to use normal coding or compression or use so-called differential coding or compression. In the former case, a color codeword is determined for each of the two texel sub-blocks, typically in the format RGB444, i.e. spending four bits per color component. This gives in total 2×12=24 bits that are spent on the two color codewords, which are indicated by reference numbers 31 and 32 in FIG. 4B where $R_0G_0B_0$ represents the first color codeword 31 and RiGiBi denotes the second color codeword 32. A diff bit 37 is then preferably included in the compressed representation 30 in order to indicate whether normal coding, such as diff bit=$0_{bin}$, or differential coding, such as diff bit=$1_{bin}$, is used. Differential coding is particular suitable for those texel blocks having slowly changing colors. In other words, the difference in averaged color for the adjacent pair of texel sub-blocks is comparatively small. In such a case, the first color codeword is preferably in the format RGB555, i.e. spending one bit more per color component as compared to normal coding. The second color codeword is preferably in the format of $\Delta R\Delta G\Delta B333$. The first base color is then obtained from the first color codeword, preferably by expanding or extending the RGB555 codeword into RGB888. The second base color is, however, obtained by adding the two color codewords $R+\Delta R$, $G+\Delta G$, $B+\Delta B$, and thereafter expanding the result to RGB888.

If the compressed representation 30 is in total 64 bits and the two color codewords 31, 32 occupy together 24 bits according to above and the diff bit 37 and flip bit 38 are present, then the two table codewords 33, 34 are of three bits each, resulting in 32 bits that can be spent on the texel indices 35, 36. Thus, two bits per texel index 35, 36 can be used as previously described.

The embodiments as disclosed herein can therefore advantageously be used as replacement of the so-called normal coding used in ETC and disclosed in document [2]. This means that in such a case, the embodiments can be complemented with the differential mode described in that document [2].

Decompression

Figure 5:
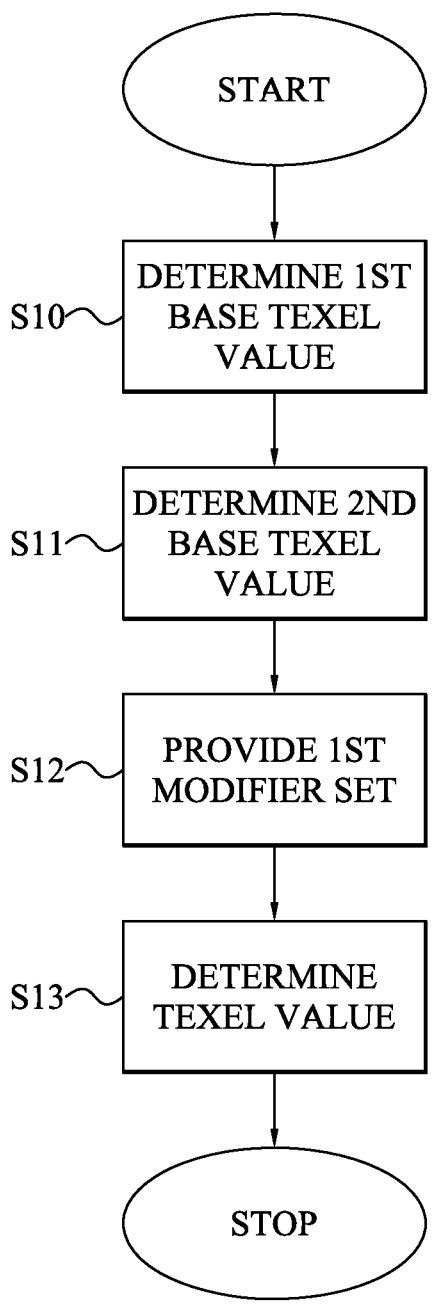
FIG. 5 is a flow diagram illustrating a method of processing a compressed representation of a texel block according to an embodiment.

FIG. 5 illustrates a flow diagram of a method of processing a compressed representation of a texel block. This processing of the compressed representation is conducted in order to decompress or decode at least one texel of the texel block consisting of a first texel sub-block and a second texel sub-block. The compressed representation comprises, at least, the previously described first value codeword and the first table codeword assigned and associated to the first texel sub-block, the second value codeword and the second table codeword assigned to the second texel sub-block, and a respective texel index for each texel in the texel sub-block.

A first optional step is to identify the compressed texel block to process. It could be possible that all compressed representations of an encoded texture or image should be decoded in order to generate a decoded representation of the original texture. Typically, only a portion of the original texture is to be accessed at a given processing instance. As a consequence, only a single or a selected number of compressed representations have to be processed in order to obtain at least one decoded or reconstructed texel.

Step S10 of FIG. 5 involves determining a first base texel value for the multiple texels in the first texel sub-block based on the first value codeword assigned to this texel sub-block. If the value codeword is in the same format as the base texel value the first base texel value is obtained directly from the first value codeword. However, the first value codeword is typically a compressed version of the first base texel value and therefore needs to be expanded or extended in order to reach the same format as the first base value. Such an expansion can be conducted by copying the most significant bits of the first value codeword to the corresponding least significant bit positions of the first base value to obtain the target bit size. If the first value codeword and the first base value each comprise multiple components, such as the red, green and blue color components, the bit expansion is preferably conducted individually for each color component. For instance, a value codeword of 1011 0011 1001 can be expanded into 10111011 00110011 10011001 as base value.

A next step S11 correspondingly determines a second base texel value for the multiple texels of the second texel sub-block based on the second value codeword. This step S11 is typically conducted in the same way as step S10 but using the second value codeword instead of the first value codeword.

Steps S10 and S11 can be conducted in sequence as illustrated in the figure or with step S11 conducted prior to step S10. Alternatively, the two steps are instead performed at least partly in parallel.

Step S12 provides a first modifier set of multiple value modifiers based on the first table codeword. These multiple value modifiers are configured to modify the first base texel value determined in step S10.

In an embodiment of step S13 a texel to be reconstructed from the first texel sub-block has a texel index that is not associated with any of the value modifiers of the first modifier set provided in step S12. This texel instead has a texel index with a defined index value, such as $00_{bin}$ when using Table 1 above. This defined index value defines that the texel value of the texel is determined based on the second base texel value instead of a modified version of the first base texel value.

Thus, if the texel index of the texel did not have the defined index value it would instead be associated with one of the value modifiers of the first modifier set. Step S13 would then have involved determining a texel value for the texel based on the selected value modifier and the first base texel value that is assigned to the texel sub-block to which the texel belongs. However, a texel index equal to the defined index value instead signals that the base texel value of the other texel sub-block will be used when determining the texel value for the texel.

As has previously been described, it could be possible that multiple of the texel indices given a particular table codeword could signal that the base texel value of the second texel sub-block should be used when determining a texel value for a texel of the first texel sub-block. In such a case, there are multiple defined index values that indicate that a value modifier of the first value modifier set should not be used to modify the first base texel value but rather the second base texel value should be used when determining the texel value for the texel.

The reconstructed texel value obtained for the texel can then be used to generate a pixel value, which is well known in the art. Typically, the reconstructed texel values of multiple texels are needed in order to calculate the pixel value of a single pixel. For instance, in bilinear interpolation a chunk of 2×2 texel values is used for determining a pixel value of a pixel in the decoded image, which is well known in the art. Correspondingly, in trilinear interpolation, eight texel values are used to determine the decoded pixel value of a single pixel.

Figure 6:
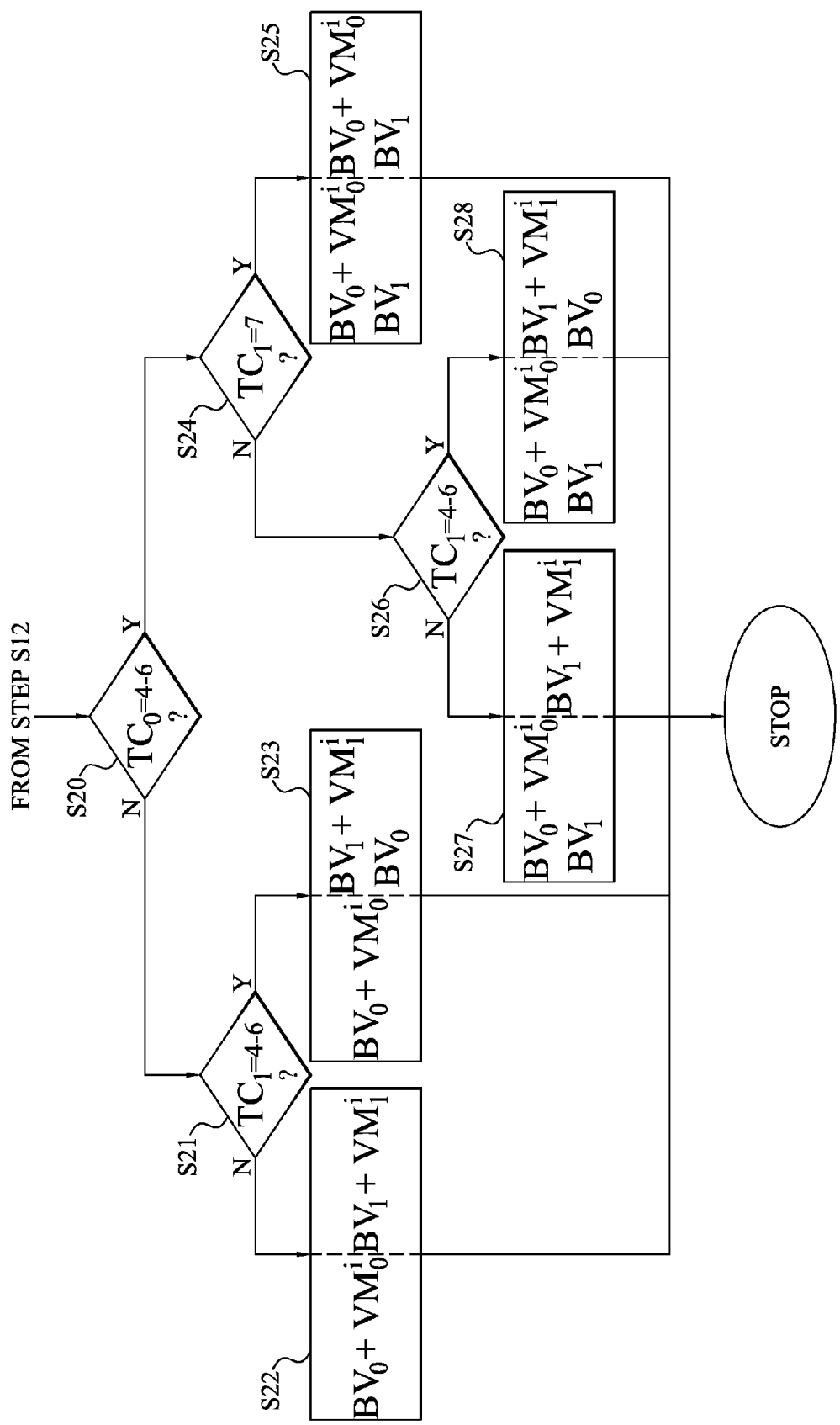
FIG. 6 is flow diagram illustrating various embodiment of the set providing step and texel value determining step in the flow diagram of FIG. 5.

FIG. 6 is a more detailed embodiment of step S13 in FIG. 5 and lists various examples of how a texel value can be determined for a texel based on the values of the table codewords and the texel index of the texel. The embodiment illustrated in FIG. 6 utilizes the modifier sets of Table 1 above or a similar distribution of modifier set, though, optionally with other value modifiers.

The method starts in step S20, which investigates whether the first table codeword, $TC_0$, has any of the values 4-6, i.e. $100_{bin}$-$110_{bin}$. If not the method continues to step S21, which investigates whether the second table codeword, $TC_1$, has any of the values 4-6. If the second table codeword does not have any of the values 4-6 the method continues to step S22. In this case, the first table codeword represents a first modifier set of multiple value modifiers and the second table codeword correspondingly represents a second modifier set of multiple value modifiers, see table codewords 0-3 in Table 1. A texel value of a texel is then determined in step S22 based on the base texel value associated with the texel sub-block to which the texel belongs and the value modifier associated with the texel index of the texels. Thus, the texel value of a texel i from the first texel sub-block is obtained by modifying the first base value, $BV_0$, with the value modifier, $VM_0^i$, associated with the texel index of texel i and selected from the first modifier set. The same procedure is applied to a texel i from the second texel sub-block but then the second base value, $BV_1$, is instead used and the value modifier, $VM_1^i$, is selected from the second modifier set.

In the figure, modification of a base texel value with a value modifier has been exemplified by the addition of the value modifier to the base texel value. In alternative embodiments other types of modifications could instead be used such as multiplication or XOR-operation. If the base value comprises multiple components, the value modifier is preferably added to each of the multiple components or the multiple components are otherwise individually modified with the value modifier.

In step S22 and steps S23, S25, S27 and S28 of FIG. 6, the operation(s) illustrated in the left part correspond(s) to texels in the first texel sub-block of the texel block, whereas the operation(s) in the right part of the hatched line relate(s) to texels in the second texel sub-block.

If, however, the second table codeword has a value of 4-6 the method continues from step S21 to step S23. The calculation of a texel value for a texel in the first texel sub-block is performed in the same way in step S23 as in step S22. However, for texels in the second texel sub-block the texel value is either determined by modifying the second base texel value with a value modifier selected from the second modifier set using the texel index associated with the texel or determined based on the first base texel value assigned to the first texel sub-block. For instance and with reference to Table 1, if the texel index is one of $11_{bin}$, $10_{bin}$ and $01_{bin}$ one of the value modifiers of the second modifier set, such as −12, 0, 12 if the second table codeword=$100_{bin}$, is selected and used to modify the second base texel value. However, if the texel index of a texel instead is $00_{bin}$ the texel value of that texel is determined based on the first base texel value, such as is equal to the first base texel value.

If the first table codeword has a value of 4-6 in step S20 the method continues to step S24. In this case it is determined whether the second table codeword has a value of 7, i.e. $111_{bin}$. In such a case, the method continues to step S25. Having a first table codeword of 4-6 implies that a first modifier set comprising multiple value modifiers is provided based on the first table codeword. If the texel index of a texel in the first texel sub-block has, according to Table 1, one of the values $11_{bin}$, $10_{bin}$ and $01_{bin}$ one of the value modifiers of the first modifier set, such as −32, 0, 32 if the first table codeword=$101_{bin}$, is selected and used to modify the first base texel value. If the texel index of a texel is $00_{bin}$ the texel value of that texel is instead determined based on the second base texel value, such as equal to the second base texel value.

In this case the second table codeword has a defined codeword value, i.e. $111_{bin}$ according to Table 1. This implies that the second table codeword is not associated with any modifier set comprising multiple value modifiers. In clear contrast, the modifier set represented by the first table codeword associated to the first texel sub-block and the first base texel value will be used also for the second texel sub-block. This means that if a texel of the second texel sub-block has any of the values $11_{bin}$, $10_{bin}$ and $01_{bin}$ one of the value modifiers of the first modifier set, such as −32, 0, 32 if the first table codeword=$101_{bin}$, is selected and used to modify the first base texel value in the same way as for texels of the first texel sub-block having the same texel value. If the texel index of the texel in the second sub-block instead has the defined index value, such as $00_{bin}$, the texel value of the texel is determined based on the second base texel value. As is evident from the operations presented in step S25 the same texel values can be obtained in both texel sub-blocks.

If the second table codeword does not have the defined codeword value, such as $111_{bin}$, the method instead continues from step S24 to step S26. Step S26 investigates whether the second table codeword has a value representing a modifier set comprising multiple value modifiers or representing a modifier set comprising at least one less value modifier but having the possibility of selecting the base texel value of the other texel sub-block. Thus, if the second table codeword is one of 0-3 according to Table 1, the method continues to step S27. The determination of the texel values for texels in the first texel sub-block is then performed in the same way as in step S25. The texel values for the texels in the second texel sub-block are instead determined as previously described in connection with step S22.

Finally, if both the first and second table codewords have a value of 4-6 according to Table 1, the method continues from step S26 to step S28. The texel values for the texels in the first texel sub-block are determined in step S28 in the same way as in step S25 and S27. Determination of the texel values for the second texel sub-block is conducted in the same way as previously discussed in step S23. It is anticipated by the invention that the order of steps S24 and S26 could be switched in the figure.

In FIG. 6 and in steps S25, S27 and S28 the texel value of a texel in the first texel sub-block having a texel index of the defined index value is equal to the second base texel value of the second texel sub-block and in steps S23 and S28 the texel value of texel in the second texel sub-block having a texel index of the defined index value is equal to the first base texel value of the first texel sub-block. In alternative embodiments, the texel value could in these cases be determined as a linear combination of the first and second base texel value or based on a defined value modifier and the first or second base texel value as previously described.

In the embodiment illustrated in FIG. 6 it is not possible for both table codewords to have the defined codeword value, i.e. $111_{bin}$. The reason for this is that in such a case no value modifiers would be available for any of the texel sub-blocks. Hence, at most one of the texel sub-blocks can have the defined codeword value and in the figure that texel sub-block has been denoted the second texel sub-block. In the figure, no dedicated steps of the case when the second table codeword has the defined codeword value and the first table codeword has any of the values 0-3 have been illustrated. The reason for this is that such a case can actually be handled according to step S22 by selecting the same value codeword and table codewords for both texel sub-blocks.

In a particular embodiment of FIG. 5, step S10 involves determining a first base color for the first texel sub-block based on a first color codeword. Step S11 correspondingly determines a second base color for the second texel sub-block based on a second color codeword. In such a case, step S12 provides a first modifier set of multiple intensity modifiers that are designed to modify the intensity of the first base color. Intensity modification implies, when applied to a base color in the RGB format, addition of the intensity modifier to all color components of the RGB base color. This corresponds to moving from the point in the RGB space represented by the first base color along the line (1, 1, 1) to the point in the RGB space represented by the intensity modified base color. Step S13 comprises determining, for a texel of the first texel sub-block and if a texel index of the texel has a defined value, a color for the texel based on the second base color.

DECOMPRESSION EXAMPLE

Three decompression examples are presented below illustrating how the embodiments can be used in connection with texel blocks having RGB colors as texel values. In these examples a compressed representation as illustrated in FIG. 4B is assumed.

Example 1

In this example the following compressed representation is assumed:
1011 0001 1100 1111 0111 1101 110 000 01 00 . . . 00 11 . . . 0 1
The diff bit is $0_{bin}$ in this case representing normal decompression. The flip bit is set to $1_{bin}$ implying a layout as in FIG. 2B.

The base colors are first determined from the color codewords by expanding the 4-bit color components into 8-bit format:
$R_0$: 1011→$10111011_{bin}$=187
$G_0$: 1100→$11001100_{bin}$=204
$B_0$: 0111→$01110111_{bin}$=119
$R_1$: 0001→$00010001_{bin}$=17
$G_1$ 1111→$11111111_{bin}$=255
$B_1$ 1101→$11011101_{bin}$=221

The first table codeword is $110_{bin}$ corresponding to modifier set 6 in Table 1 and the second table codeword is $000_{bin}$ representing modifier set 0 in Table 1.

The modifier set to use for the first texel sub-block is [−64, 0, X, 64] according to Table 1. The first texel of the first texel sub-block has texel index $01_{bin}$ corresponding to the intensity modifier 64. The color of the first texel is then obtained by the following intensity modification (187+64, 204+64, 119+64)=(251, 268, 183). In a preferred embodiment, the intensity modified color components are then clamped between a minimum color value and a maximum color value. Thus, if a color component can be represented by n bits the clamping is preferably performed to the interval $[0, 2^n-1]$. If the intensity modified color component is smaller than the minimum value, such as 0, it is replaced by this minimum value. Correspondingly, if the intensity modified color component is larger than the maximum value $2^n-1$ it is replaced by the maximum value. This preferred claimping is advantageously also conducted for the other embodiments with base texel value and value modifier and are therefore not necessarily limited to the embodiment with RGB colors and intensity modification.

In the present example, clamping is performed between 0 and 255. Thus, the final color value of the first texel will be (251, 255, 183).

The second texel in the first texel sub-block has texel index $00_{bin}$. This indicates that the color of that texel will be equal to the second base color, i.e. (17, 255, 221).

The modifier set for the second texel sub-block is [−12, −4, 4, 12]. The first texel of the second texel sub-block has a texel index of $00_{bin}$ corresponding to an intensity modifier of 4. The intensity modified color of that texel is therefore (17+4, 255+4, 221+4)=(21, 259, 225) and (21, 255, 225) after clamping. The second texel has a texel index of $11_{bin}$ associated with the intensity modifier −12, which results in the following color (17−12, 255−12, 221−12)=(5, 243, 209). The at least partly decompressed texel block now looks like:

| (251, 255, 183) | (17, 255, 221) |
| (21, 255, 225) | (5, 243, 209) |

Example 2

In this example the following compressed representation is assumed:
1011 0001 1100 1111 0111 1101 110 100 01 00 . . . 01 00 . . . 01

The diff bit is $0_{bin}$ in this case representing normal decompression. The flip bit is set to $1_{bin}$ implying a layout as in FIG. 2B.

The base colors are first determined from the color codewords by expanding the 4-bit color components into 8-bit format:
$R_0$: 1011→$10111011_{bin}$=187
$G_0$: 1100→$11001100_{bin}$=204
$B_0$: 0111→$01110111_{bin}$=119
$R_1$: 0001→$00010001_{bin}$=17
$G_1$: 1111→$11111111_{bin}$=255
$B_1$: 1101→$11011101_{bin}$=221

The first table codeword is $110_{bin}$ corresponding to modifier set 6 in Table 1 and the second table codeword is $100_{bin}$ representing modifier set 4 in Table 1.

The determination of the colors for the two first texels in the first texel sub-block is performed in the same way as in Example 1 above.

The modifier set to use for the second texel sub-block is [−12, 0, X, 12] according to Table 1. The first texel of the second texel sub-block has texel index $01_{bin}$ corresponding to the intensity modifier 12. The color of the first texel is then obtained by the following intensity modification (17+12, 255+12, 221+12)=(29, 267, 233) and (29, 255, 233) after clamping.

The second texel in the second texel sub-block has texel index $00_{bin}$. This indicates that the color of that texel will be equal to the first base color, i.e. (187, 204, 119). The at least partly decompressed texel block now looks like:

| (251, 255, 183) | (17, 255, 221) |
| (29, 255, 233) | (187, 204, 119) |

Example 3

In this example the following compressed representation is assumed:
1011 0001 1100 1111 0111 1101 110 111 01 00 . . . 11 00 . . . 0 1

The diff bit is $0_{bin}$ in this case representing normal decompression. The flip bit is set to $1_{bin}$ implying a layout as in FIG. 2B.

The base colors are first determined from the color codewords by expanding the 4-bit color components into 8-bit format:
$R_0$: 1011→$10111011_{bin}$=187
$G_0$: 1100→$11001100_{bin}$=204
$B_0$: 0111→$01110111_{bin}$=119
$R_1$: 0001→$00010001_{bin}$=17
$G_1$: 1111→$11111111_{bin}$=255
$B_1$: 1101→$11011101_{bin}$=221

The first table codeword is $110_{bin}$ corresponding to modifier set 6 in Table 1 and the second table codeword is $111_{bin}$ representing modifier set 7 in Table 1.

The determination of the colors for the two first texels in the first texel sub-block is performed in the same way as in Example 1 above.

In this case the second table codeword indicates that the intensity modifiers and base color of the first texel sub-block should also be used for the second texel sub-block.

The first texel of the second texel sub-block has a texel index of $11_{bin}$, which corresponds to an intensity modifier of −64 in the modifier set [−64, 0, X, 64] represented by the first table codeword. The color of this first texel is, thus, (187−64, 255−64, 119−64)=(123, 191, 55).

The second texel of the second texel sub-bock has a texel index $00_{bin}$ indicating that the base color of the second texel sub-block should be used as color for that texel, i.e. (17, 255, 221). The at least partly decompressed texel block now looks like:

| (251, 255, 183) | (17, 255, 221) |
| (123, 191, 55) | (17, 255, 221) |

Compressing System

Figure 7:
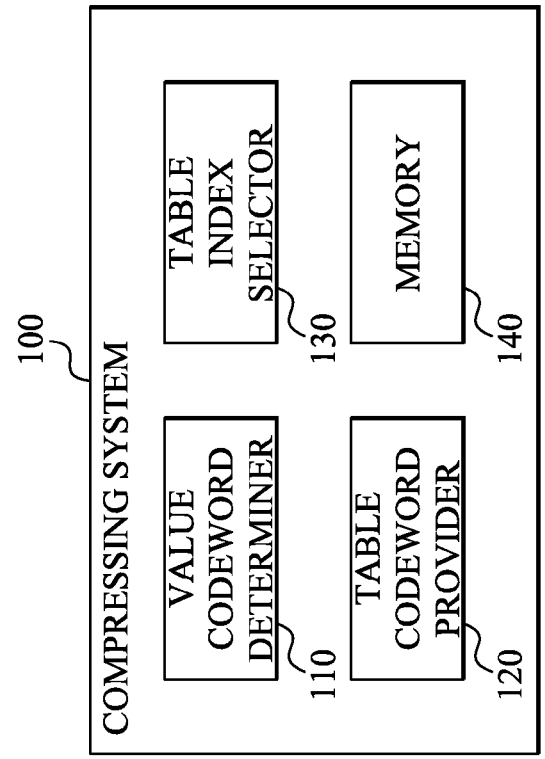
FIG. 7 is a schematic block diagram of a compressing system according to an embodiment.

FIG. 7 is a schematic block diagram of a system for compressing a texel block, denoted compressing system 100 in the figure. The compressing system 100 comprises a value codeword determiner 110 configured to determine a first value codeword based on texel values of at least a portion of the multiple texels of the texel block and a second value codeword based on texel values of at least a portion of the multiple texels of the texel block. The first value codeword is a representation of a first base texel value for the multiple texels of the first texel sub-block of the texel block and the second value codeword is a representation of a second base texel value for the multiple texels of the second texel sub-block.

The value codeword determiner 110 can be operated in order to determine the value codewords to be an average or median of the texel values in respective texel sub-block, such as a compressed average or median of the texel values. In an alternative approach, the value codeword determiner 110 operates together with a table codeword provider 120 and table index selector 130 of the compressing system 100 for trying all available combinations of value codewords, table codewords and table indices. The difference between the reconstructed texel values obtained following decompressing such a candidate compressed representation of the texel block and the original texel block is calculated for each candidate compressed representation. The candidate compressed representation resulting in the smallest difference or error value as determined by the compressing system 100 is then selected as compressed representation of the texel block. In this context different error metrics can be used such as mean square error or sum of absolute differences, which are all well-known in the art.

The table codeword provider 120 is configured to provide a first table codeword for the first texel sub-block and a second table codeword for the second texel sub-block. The first table codeword is a representation of a first modifier set of multiple value modifiers for modifying the first base texel value.

The table index selector 130 is configured a respective texel index for each texel in the texel block. This texel index is, for a texel in the first texel sub-block, associated with a value modifier of the first modifier set or indicates that the base texel value for the texel is based on the second base texel value.

In an embodiment, the base texel value for the texel is equal to the second base texel value. Alternatively, it could be a combination, such as linear combination of the first and second base texel values or the second base texel value modified with a defined value modifier as previously described.

The compressing system 100 also comprises a memory 140 configured to store a compressed representation of the texel block comprising the first and second value codewords, the first and second table codewords and the texel indices. The compressed representation may optionally comprise other elements such as the previously described flip bit and the optional diff bit.

In a particular embodiment, the table codeword provider 120 provides a second table codeword that is a representation of a second modifier set of multiple value modifiers for modifying the second base texel value represented by the second value codeword determined by the value codeword determiner 110.

The table index for a texel of the second texel sub-block can then be selected by the table index selector 130 to either be associated with a value modifier of the second modifier set or indicates that the base texel value for the texel is based on the first base texel value.

In an alternative embodiment the table index for the texel in the second texel block selected by the table index selector 130 can only be associated with a value modifier of the second modifier set.

In another particular embodiment, the table codeword provider 120 is configured to provide a second table codeword that indicates that the first value codeword is to be used as value codeword for the second texel sub-block and that the first table codeword is to be used as table codeword for the second texel sub-block.

The compressing system 100 can be implemented in hardware, software or a combination of hardware and software. If implemented in software the compressing system 100 is implemented as a computer program product stored on a memory and loaded and run on a general purpose or specially adapted computer, processor or microprocessor. The software includes computer program code elements or software code portions effectuating the operation of the value codeword determiner 110, the table codeword provider 120 and the table index selector 130 of the compressing system 100. The program may be stored in whole or part, on or in one or more suitable computer readable media or data storage means such as magnetic disks, CD-ROMs, DVD disks, USB memories, hard discs, magneto-optical memory, in RAM or volatile memory, in ROM or flash memory, as firmware, or on a data server.

User Terminal

Figure 8:
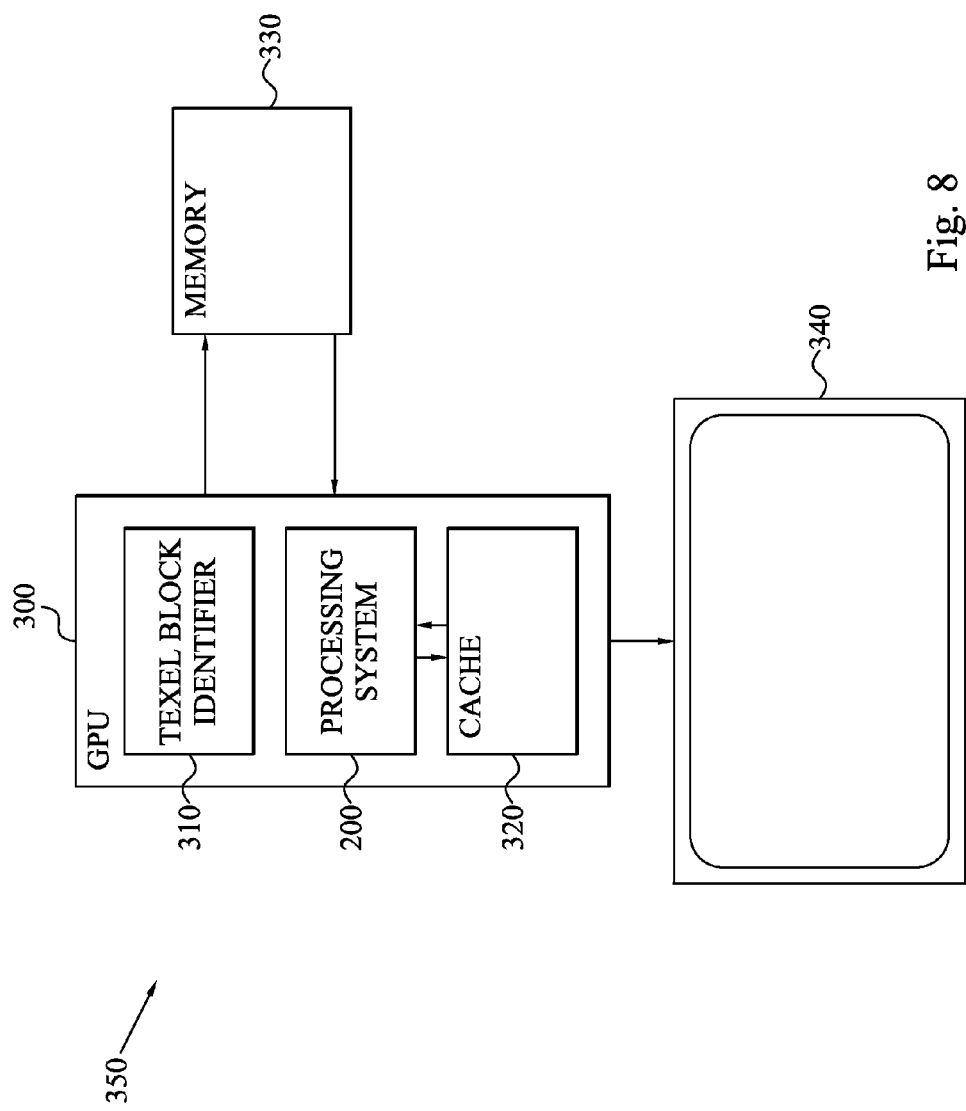
FIG. 8 is a schematic block diagram of a user terminal comprising a graphical processing unit having a processing system according to an embodiment.

FIG. 8 schematically illustrates an implementation structure of a user terminal 350 with a processing system 200 according to an embodiment. The user terminal 350 comprises a memory 330, typically a RAM, having memory locations comprising compressed representations of texel blocks. A graphical processing unit (GPU) 300 is connected to the memory 330 through a memory bus. The GPU 300 includes a texel block identifier 310 for identifying a texel block, the compressed representation of which should be fetched from the memory 330. The texel block identifier 310 basically calculates the address of the compressed representation in the memory 330 and sends a memory access request over the bus to the memory 330. The compressed representation present in the memory location assigned or dedicated to the texel block is read from the memory 330 and transferred over the bus to the processing system 200 or to a cache 320 of the GPU 300.

The processing system 200 comprises or is connected to at least one cache 320 having cache locations or areas for storing compressed texel blocks or processed and decoded texel values. In an alternative embodiment, the GPU 300 could comprise multiple caches 320, such as a texture cache and color buffer cache. The GPU 300 is typically connected to a display screen 340, on which a decoded image is displayed.

The GPU 300 and its included units 310, 320, 200 may be provided in one or more chips, for instance of a graphics card, video card or a motherboard. The implementation structure of FIG. 8 can be implemented in any image or texture processing unit or device including, for instance, a computer, a game console, a portable device, such as mobile telephone or media processing device as illustrative examples of a user terminal 350.

Processing System

Figure 9:
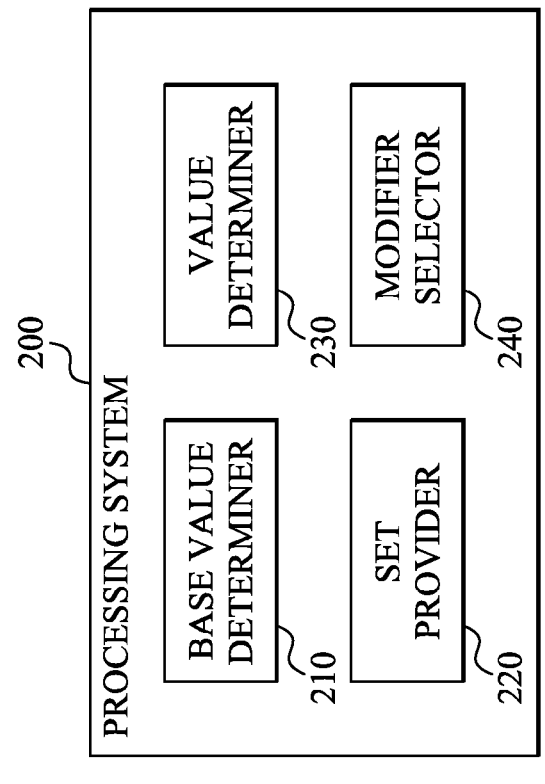
FIG. 9 is a schematic block diagram of a processing system according to an embodiment.

FIG. 9 is a schematic block diagram of an embodiment of a system for processing a compressed representation of a texel block, denoted processing system 200 in the figure. The processing system 200 comprises a base value determiner 210 configured to determine a first base texel value for the multiple texels of a first texel sub-block of the texel block based on the first value codeword of the compressed representation. The base value determiner 210 correspondingly determines a second base texel value for the multiple pixels in a second texel sub-block of the texel block based on a second value codeword included in the compressed representation. The respective base texel values could be obtained directly from the value codewords. The base value determiner 210 then simply retrieves the relevant bit sequences corresponding to the value codewords from the compressed representation. In an alternative approach, the base value determiner 210 additionally expands the value codewords as previously described in order to get the base texel values in the correct format, i.e. bit length.

A set provider 220 of the processing system 200 is configured to provide a first modifier set of multiple value modifiers based on a first table codeword in the compressed representation. These value modifiers are to be used for modifying the first base texel value determined by the base value determiner 210 in order to get respective reconstructed texel values.

The processing system 200 also comprises a value determiner 230 configured to determine, for a texel in the first texel sub-block and if a texel index of the texel has a defined index value, a texel value of the texel based on the second base texel value determined by the base value determiner 210.

In an embodiment, the value determiner 230 simply outputs the second base texel value as texel value for the given texel. In alternative embodiments as previously described, the value determiner 230 calculates a combination, such as linear combination, of the first and second base texel values or a modified version of the second base texel value as texel value of the texel.

If the texel index of the texel does not have the defined index value a preferred modifier selector 240 of the processing system 200 becomes operational and selects a value modifier from the first modifier set provided by the set provider 220. This modifier selection is further more performed by the modifier selector 240 based on the texel index of the texel. In such a case, the value determiner 230 is configured to determine the texel value for the texel based on modifying the first base texel value with the value modifier selected by the modifier selector from the first modifier set. The modification performed by the value determiner 230 can be addition of the value modifier to the first base texel value, multiplication of the value modifier and the first base texel value or XORing the value modifier and the first base texel value.

In an embodiment the set provider 220 is configured to provide a second modifier set based on the second table codeword of the compressed representation. This second modifier set comprises multiple value modifiers for modifying the second base texel value determined by the base value determiner 210.

In this embodiment the value determiner 230 is configured to determine, for a texel in the second texel sub-block and if the texel index of the texel has a defined value, a texel value based on the first base texel value determined by the base value determiner 210.

If the texel index of the texel is not of the defined value or if another texel of the texel sub-block does not have texel index equal to the defined value, the modifier selector 240 selects a value modifier from the second modifier set based on the texel index. The value determiner 230 is then configured to determine the texel value of the texel based on modifying the second base texel value with the value modifier selected by the modifier selector 240.

In an alternative embodiment, the second table codeword does not allow the texels of the second texel sub-block to have their texel values determined based on the first base texel value. In such a case, regardless of the actual texel value of texel in the second texel sub-block, the modifier selector 240 will use the texel value in order to identify one of the value modifiers from the second modifier set provided by the set provider 220. The value determiner 230 uses this selected value modifier in order to modify the second base texel value to get the texel value for the texel.

In a particular embodiment and if the second table codeword assigned to the second texel sub-block has a defined codeword value and a texel index of a texel in the second texel sub-block does not have a defined texel value, the modifier selector 240 is configured to select a value modifier from the first modifier set based on the texel index of the texel. The value determiner 230 generates the texel value for the texel based on modifying the first base texel value with the value modifier selected by the modifier selector 240.

If instead the second table codeword has the defined codeword value a texel index of a texel in the second texel sub-block has the defined texel value, the value determiner 230 determines a texel value for the texel based on the second base texel value.

The processing system 200 can be implemented in hardware, software or a combination of hardware and software. If implemented in software the processing system 200 is implemented as a computer program product stored on a memory and loaded and run on a general purpose or specially adapted computer, processor or microprocessor. The software includes computer program code elements or software code portions effectuating the operation of the base value determiner 210, the set provider 220, the value determiner 230 and the modifier selector 240 of the processing system 100. The program may be stored in whole or part, on or in one or more suitable computer readable media or data storage means such as magnetic disks, CD-ROMs, DVD disks, USB memories, hard discs, magneto-optical memory, in RAM or volatile memory, in ROM or flash memory, as firmware, or on a data server.

However, it is generally preferred to implement the processing system 200 in hardware, such as forming part of a GPU as illustrated in FIG. 8. An example of such a hardware implementation of the processing system 100 is illustrated in FIG. 10.

Figure 10:
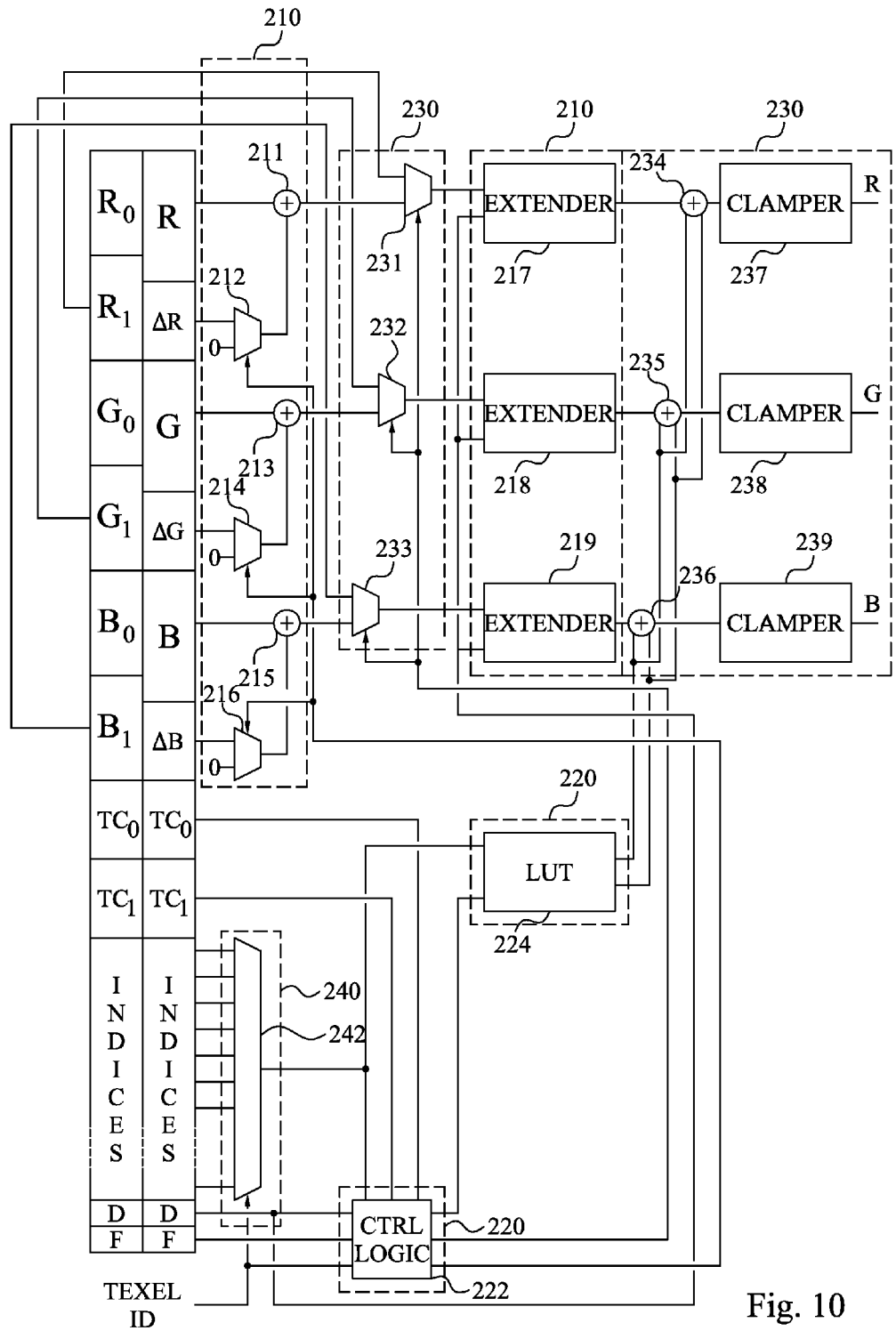
FIG. 10 is a hardware implementation of a processing system according to an embodiment.

In FIG. 10 the compressed representation of the texel block is indicated to either be generated according to the normal mode or the differential mode as previously discussed.

A first set of three multiplexors 212, 214, 216 are arranged to receive a 3-bit word each. In the differential mode, the 3-bit input word is the three bits of a color component of the second color codeword. In the normal mode, the 3-bit word corresponds to the three least significant bits of the color components of the second color codewords. The other multiplexor input is zero. The multiplexors 212, 214, 216 either outputs zero or the three bits depending on the output of a control logic 222. The outputs of the multiplexors 212, 214, 216 are connected to respective adders 211, 213, 215 that additionally receives a 5-bit word corresponding to the respective color components of the first color codeword in the differential mode. In the normal mode the 5-bit words correspond to the respective color components of the first color codeword and the most significant bit of the respective color components of the second color codeword.

The adders 211, 213, 215 add the multiplexor outputs to the color components of the first color codeword in the differential mode. One input to the adders 211, 213, 215 is a 5-bit word and the other is a 3-bit word. In a preferred implementation, the most significant bit of the 3-bit word is first copied to the two most significant bit of a 5-bit word comprising the 3-bit word in the three least significant bits. Thus, if the 3-bit word denotes a positive number $0_{bin}$ will occupy the two most significant bits of the 5-bit word otherwise these two bit positions will be $1_{bin}$.

The adder outputs are connected to a set of three multiplexors 231, 232, 233 that also receives respective 4-bit input words corresponding to the color components of the second color codeword in the normal mode and the least significant bit of the respective color components of the first color codeword and the respective color components of the second color codeword in the differential mode.

The multiplexors 231, 232, 233 perform the selection of the two input words based on the output from the control logic 222, which is further described herein.

The multiplexor outputs are connected to respective extenders 217, 218, 219 that additionally preferably receive the diff bit of the compressed representation. The extenders 217, 218, 219 conduct an extension of the input 4-bit or 5-bit words to respective 8-bit color components. The diff bit that is input to the extenders 217, 218, 219 define whether the extension is from a 4-bit word (normal mode, diff bit=$0_{bin}$) or a 5-bit word (differential mode, diff bit=$1_{bin}$).

The extender outputs are connected to respective adders 234, 235, 236 that adds a 9-bit intensity modifier to the respective color components. The adder outputs are connected to respective clampers 237, 238, 239 that clamp the adder outputs into the final RGB color components of a texel within the interval [0, 255].

A code book look-up table (LUT) 224 is arranged for receiving the 3-bit table codeword from the control logic 222. The LUT 224 additionally receives a 2-bit texel index associated with the texel to decompress. This 2-bit texel index is received from a multiplexor 242 that has inputs connected to receive the 16 2-bit texel indices of the compressed representation. The multiplexor 242 selects and outputs one of these texel indices based on a 4-bit texel identifier corresponding to the position of the texel within the texel block.

The LUT 224 then selects appropriate intensity modifier based on the table codeword from the control logic 222 and the texel index from the multiplexor 242.

The LUT 224 not only outputs the 9-bit intensity modifier to the adders 234, 235, 236 but preferably also a sign bit that is further discussed in connection with FIG. 12. If this sign bit is $1_{bin}$ the intensity modifier should be negative. This is accomplished by adding one to the intensity modifier value that is inverted when output from LUT 224. If the sign bit instead is $0_{bin}$ the intensity modifier should be positive and one should not be added to the intensity modifier by the adders 234, 235, 236. Thus, in such a case the non-inverted value from the LUT 224 is directly added by the adders 234, 235, 236 to the respective extender outputs.

The output from the multiplexor 242 is also connected to one of the inputs of the control logic 222. The control logic 222 has five additional inputs one for the 1-bit diff bit (D), one for the 1-bit flip bit (F), one for the 4-bit texel identifier, one for the first table codeword and one for the second table codeword.

Figure 11:
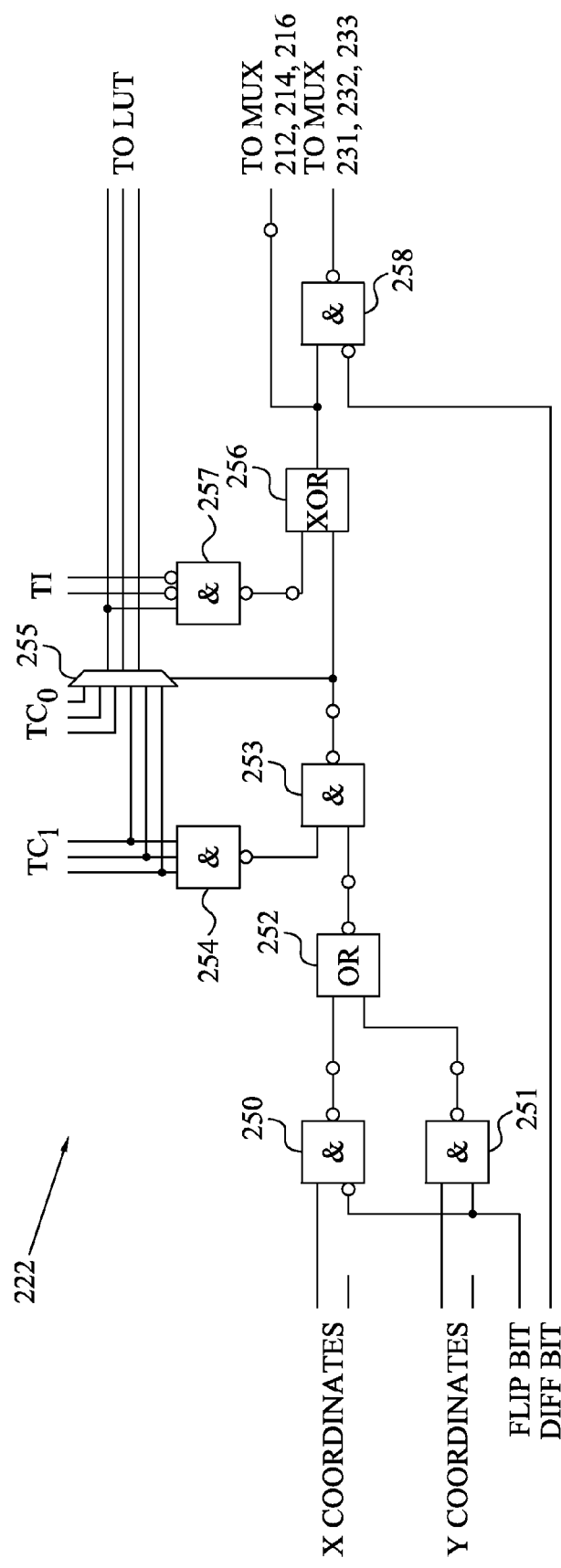
FIG. 11 is a hardware implementation of the control logics of the processing system in FIG. 10 according to an embodiment.

An embodiment of the control logic 222 is disclosed in more detail in FIG. 11. In this and following figures AND and OR operators are implemented as NAND and NOR operators followed by a NOT operator. Such an implementation is typically cheaper in terms of the number of gates as compared to having regular AND and OR operators. However, in other embodiments AND and OR operators could be used instead of at least one of the NAND+NOT and NOR+NOT operators in the figures.

The control logic comprises a first NAND operator 250 with associated NOT operator that is configured to receive the most significant coordinate of the X-coordinate of the texel within the texel block and a negated version of the flip bit. The output from the NAND operator 250 and the associated NOT operator is $1_{bin}$ if the texel belongs to the second texel sub-block and the texel block is according to FIG. 2A and is otherwise $0_{bin}$. A second NAND operator 251 with following NOT operator correspondingly receives the most significant Y-coordinate of the texel and the flip bit. This NAND operator 251 and NOT operator outputs $1_{bin}$ if the texel belongs to the second texel sub-block and the texel block is according to FIG. 2B and is otherwise $0_{bin}$.

The outputs from the NOT operators are connected to the input of a NOR operator 252 with associated NOT operator. The output from the NOT operator, which is $1_{bin}$ if the texel belongs to the second texel sub-block and $0_{bin}$ otherwise, is input to a third NAND operator 253 with following NOT operator. The other input of the NAND operator 253 is connected to the output of a fourth NAND operator 254 that does not have any following NOT operator. This fourth NAND operator 254 receives the three bits of the second table codeword. The NAND operator 254 therefore outputs $0_{bin}$ when the second table codeword is $111_{bin}$ and otherwise outputs $1_{bin}$. The output from the third NAND operator 253 and its following NOT operator is $1_{bin}$ if the texel belongs to the second texel sub-block and the second table codeword is any of 0-6. This output is used to control a multiplexor 255 that selects between the first table codeword and the second table codeword. Thus, if the output is $1_{bin}$ (texel in second texel sub-block and second table codeword is not 7) the multiplexor 255 outputs the second codeword and otherwise (texel in first texel sub-block or texel in second texel sub-block and second table codeword is 7) it outputs the first table codeword.

The output from the third NAND operator 253 and its following NOT operator is also connected to an input of an XOR operator 256. The other input is connected to the output from a fifth NAND operator 257 having a following NOT operator. This fifth NAND operator 257 receives the most significant bit of the table codeword from the multiplexor 255 and negated versions of the texel index (TI) of the texel.

The output from the fifth NAND operator 257 and its NOT operator is therefore $1_{bin}$ if the table codeword from the multiplexor is any of 4-7 and if the texel index is $00_{bin}$.

The XOR operator 256 output is connected to the multiplexors 212, 214, 216 through a NOT operator and controls whether these multiplexors 212, 214, 216 should output the first base color or the second base color.

The XOR operator 256 output is also connected to a sixth NAND operator 258. The other input of the NAND operator 258 receives a negated version of the diff bit. The output from the NAND operator 258 controls the operation of the multiplexors 231, 232, 233.

Table 3 below lists the control signals to the multiplexors 212, 214, 216 and the multiplexors 231, 232, 233 as determined by the control logic depending on the which sub-block the texel belongs to, the diff bit, the table codeword and the texel index.

TABLE 3

Control signals to MUX

| Sub-block | Diff bit | Table codeword | Texel index | Control signal to MUX 212, 214, 216 | Control signal to MUX 231, 232, 233 |
|---|---|---|---|---|---|
| 0 | 0 | $TC_0$ = 0-3 | is 00 | 1 | 1 |
| 0 | 0 | $TC_0$ = 0-3 | is not 00 | 1 | 1 |
| 0 | 0 | $TC_0$ = 4-6 | is 00 | 0 | 1 |
| 0 | 0 | $TC_0$ = 4-6 | is not 00 | 1 | 1 |
| 0 | 1 | $TC_0$ = 0-3 | is 00 | 1 | 1 |
| 0 | 1 | $TC_0$ = 0-3 | is not 00 | 1 | 1 |
| 0 | 1 | $TC_0$ = 4-6 | is 00 | —* | 0 |
| 0 | 1 | $TC_0$ = 4-6 | is not 00 | 1 | 1 |
| 1 | 0 | $TC_1$ = 0-3 | is 00 | 0 | 1 |
| 1 | 0 | $TC_1$ = 0-3 | is not 00 | 0 | 1 |
| 1 | 0 | $TC_1$ = 4-6 | is 00 | 1 | 1 |
| 1 | 0 | $TC_1$ = 4-6 | is not 00 | 0 | 1 |
| 1 | 1 | $TC_1$ = 0-3 | is 00 | —* | 0 |
| 1 | 1 | $TC_1$ = 0-3 | is not 00 | —* | 0 |
| 1 | 1 | $TC_1$ = 4-6 | is 00 | 1 | 1 |
| 1 | 1 | $TC_1$ = 4-6 | is not 00 | —* | 0 |

*Does not matter.

Figure 12:
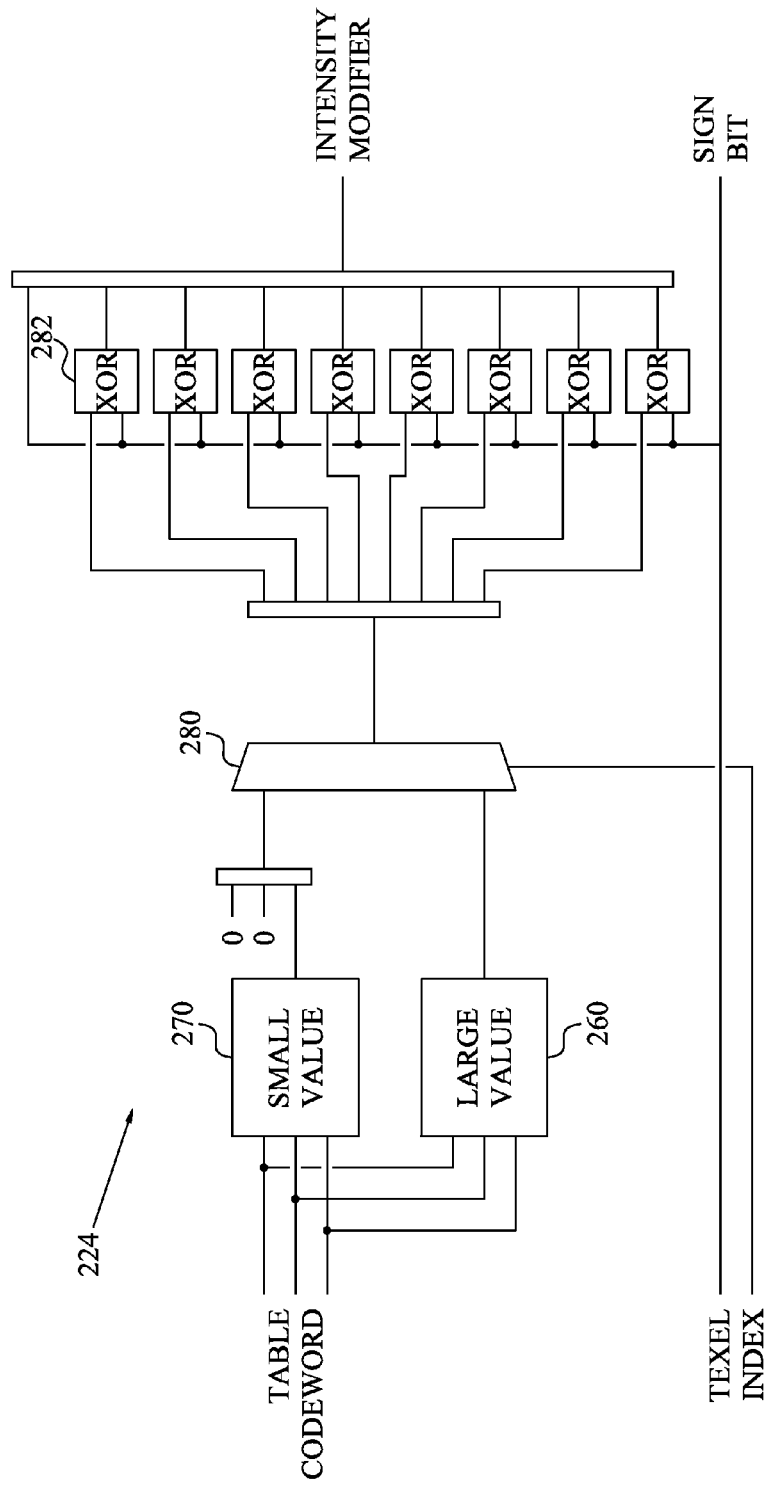
FIG. 12 is a hardware implementation of the look-up table of the processing system in FIG. 10 according to an embodiment.

FIG. 12 is hardware implementation example of the code book LUT 224 of the processing system. The LUT 224 receives the 3-bit table codeword from the control logics and these three bits are input to a small value unit 270 and a large value unit 260. These two units 260, 270 output small and large intensity modifier, respectively, of the modifier set associated with the 3-bit table codeword. For instance and with reference to Table 1, if the table codeword is $000_{bin}$ the small value unit 270 outputs 4 and the large value unit 260 outputs 12. Correspondingly, if the table codeword is $110_{bin}$ the small value unit outputs 0 and the large value unit 260 outputs 64.

The 6-bit output from the small value unit 270 is converted into an 8-bit word by positioning two zeros as the most significant bits. This is done in order to bring the output, i.e. intensity modifier, from the small value unit 270 in the same 8-bit format as the output form the large value unit 260. A multiplexor 280 receives these two 8-bit intensity modifiers and selects between them based on the value of the least significant bit of the texel index. Thus, if this least significant bit is $0_{bin}$ the intensity modifier from the small value unit 270 will be output by the multiplexor 280 and otherwise the intensity modifier from the large value unit 260 is output.

Each bit of the 8-bit intensity modifier from the multiplexor 280 is input to a respective XOR operator 282 of which only one has been marked with a reference sign in order to simplify the figure. The other input to the XOR operators 282 is the most significant bit of the texel index. The outputs from the eight XOR operators form together with the most significant bit of the texel index a 9-bit intensity modifier value that is output from the LUT 224. The most significant bit of the texel index is also output from the LUT as a sign bit, i.e. deciding whether intensity modifier value should be positive ($0_{bin}$) or negative ($1_{bin}$). The XOR operators 282 will invert the multiplexor output if the most significant bit is $1_{bin}$ and otherwise simply output the multiplexor output.

Figure 13:
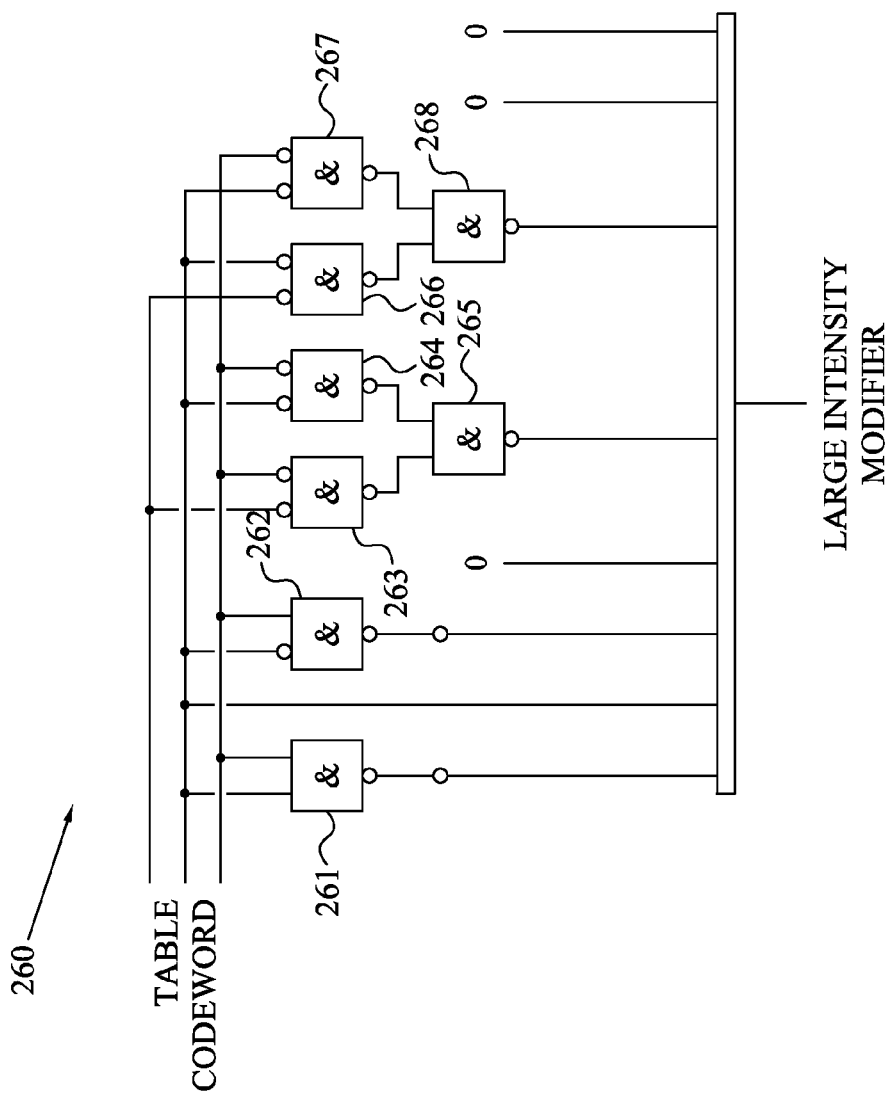
FIG. 13 is a hardware implementation of the large value unit of the look-up table in FIG. 12 according to an embodiment.

FIG. 13 is a hardware implementation of the large value unit 260 of the LUT in FIG. 12. In this example, the large value unit 260 comprises a first NAND operator 261 with following NOT operator that is connected to receive the two least significant bits of the table codeword. The output from the first NAND operator 261 with following NOT operator is the most significant bit of the large intensity modifier that is output from the large value unit 260. The second most significant bit of the large intensity modifier corresponds to the second most significant bit of the table codeword. A second NAND operator 262 with following NOT operator has one input connected to a NOT operator and therefore receives a negated version of the second most significant bit of the table codeword. The second input is the least significant bit of the table codeword. The output from the second NAND operator 262 with following NOT operator gives the third most significant bit of the large intensity modifier. The next following bit of the large intensity modifier is in this example fixed to be $0_{bin}$.

A third NAND operator 263 has its inputs connected to respective NOT operators and therefore receives negated versions of the most and least significant bits of the table codeword. A fourth NAND operator 264 also has its inputs connected to NOT operators and receives negated versions of the two least significant bits of the table codeword. The respective outputs of the third and fourth NAND operators 263, 264 are connected to a fifth NAND operator 265 that outputs the fifth most significant bit of the large intensity modifier.

A sixth NAND operator 266 has its inputs connected to respective NOT operators and therefore receives negated versions of the two most significant bits of the table codeword. A seventh NAND operator 267 also has its inputs connected to NOT operators and receives negated versions of the two least significant bits of the table codeword. The respective outputs of the sixth and seventh NAND operators 266, 267 are connected to an eighth NAND operator 268 that outputs the sixth most significant bit of the large intensity modifier.

The two least significant bits of the large intensity modifier are both fixed, in this embodiment, to be equal to $0_{bin}$.

Figure 14:
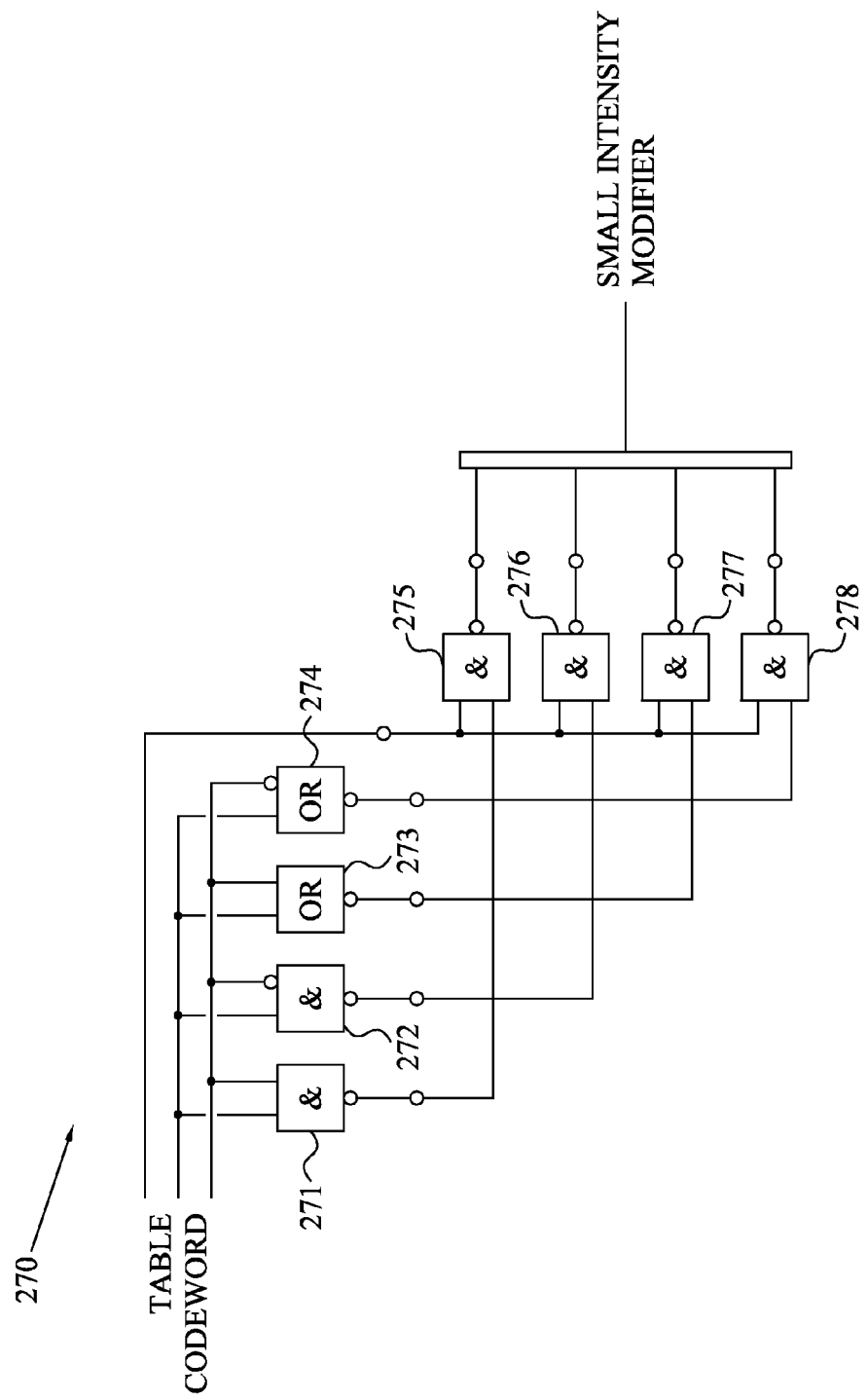
FIG. 14 is a hardware implementation of the small value unit of the look-up table in FIG. 12 according to an embodiment.

FIG. 14 is a hardware implementation example of the small value unit 270 in the LUT of FIG. 12. The small value unit 270 comprises a first NAND operator 271 with following NOT operator arranged for receiving the two least significant bits of the table codeword. A second NAND operator 272 with following NOT operator receives the second least significant bit of the table codeword and has a NOT operator connected to its other input to receive a negated version of the least significant bit of the table codeword. A first NOR operator 273 with following NOT operator also receives the two least significant bits of the table codeword. The small value unit 270 also comprises a second NOR operator 274 with following NOT operator. One of its inputs is connected to a NOT operator to receive a negated version of the least significant bit of the table codeword, whereas the other input receives the second least significant bit of the table codeword.

Each of the outputs of the NAND operators 271, 272 and NOR operators 273, 274 with following NOT operators are connected to a respective NAND operator 275, 276, 277, 278 with following NOT operator. The other input of these NAND operators 275, 276, 277, 278 receives a negated version of the most significant bit of the table codeword. The outputs of the NAND operators 275, 276, 277, 278 with following NOT operators constitute the four bits of the small intensity modifier, where the most significant bit of the small intensity modifier originates from the NAND operator 275 that receives the output of the first NAND operator 271, the second most significant bit comes from the NAND operator 276 connected to the second NAND operator 272 and the two least significant bits therefore come from the NAND operators 277, 278 that are connected to the NOR operators 273, 274 with the second NOR operator 274 contributing to the least significant bit of the small intensity modifier.

Figure 15:
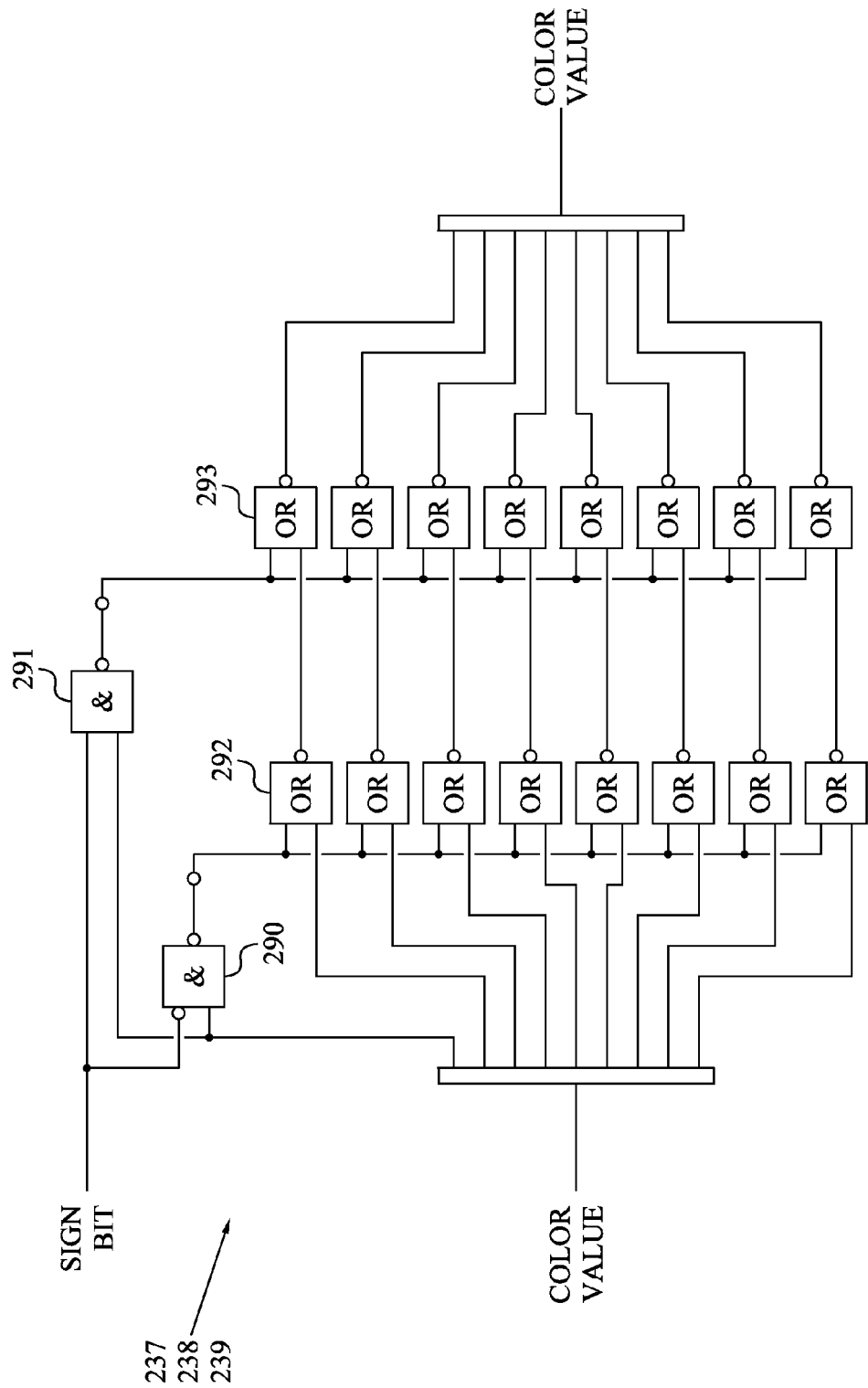
FIG. 15 is a hardware implementation of the clampers of the processing system in FIG. 10 according to an embodiment.

FIG. 15 is an illustration of hardware implementation of the clampers 237, 238, 239 of the processing system. The clampers 237, 238, 239 receive a 9-bit input word, corresponding to the intensity modified color value, from the adders and a sign bit. A first NAND operator 290 with following NOT operator receives the most significant bit of the 9-bit intensity modified color value and a negated version of the sign bit. If the sign bit is not set, i.e. $0_{bin}$, but the most significant bit of the 9-bit intensity modified color value is $1_{bit}$ there is an overflow situation, i.e. the intensity modified color value exceeds 255. The output from the first NAND operator 290 and the following NOT operator will then be $1_{bin}$ and is otherwise $0_{bin}$ if the intensity modified color value does not exceed 255.

A second NAND operator 291 with following NOT operator also receives the sign bit and the most significant bit of 9-bit intensity modified color value. If both of these bits are $1_{bin}$ the intensity modified color value is negative, i.e. smaller than zero, and an underflow situation is detected. The NAND operator 291 with following NOT operator then outputs $1_{bin}$ and otherwise outputs $0_{bin}$.

The remaining eight bits of the intensity modified color value, excluding the most significant bit, are input to respective NOR operators 292 of which only one is assigned a reference number in order to simplify the figure. The other input of the NOR operators 292 is the overflow bit from the first NAND operator 290 with following NOT operator. The outputs from the NOR operators 292 are connected to respective inputs of a second set of NOR operators 293. The other inputs of these NOR operators 293 is the underflow bit from the second NAND operator 291 with following NOT operator.

The output from the clamper 237, 238, 239 is the 8-bit intensity modified color value that is within the range of [0, 255] in this example.

In an alternative implementation the first set of NOR operators 292 are replaced by respective OR operators. The second set of NOR operators 292 are then replaced by respective AND operators. In such a case, the second NAND operator 291 is not followed by any NOT operator.

Figure 16:
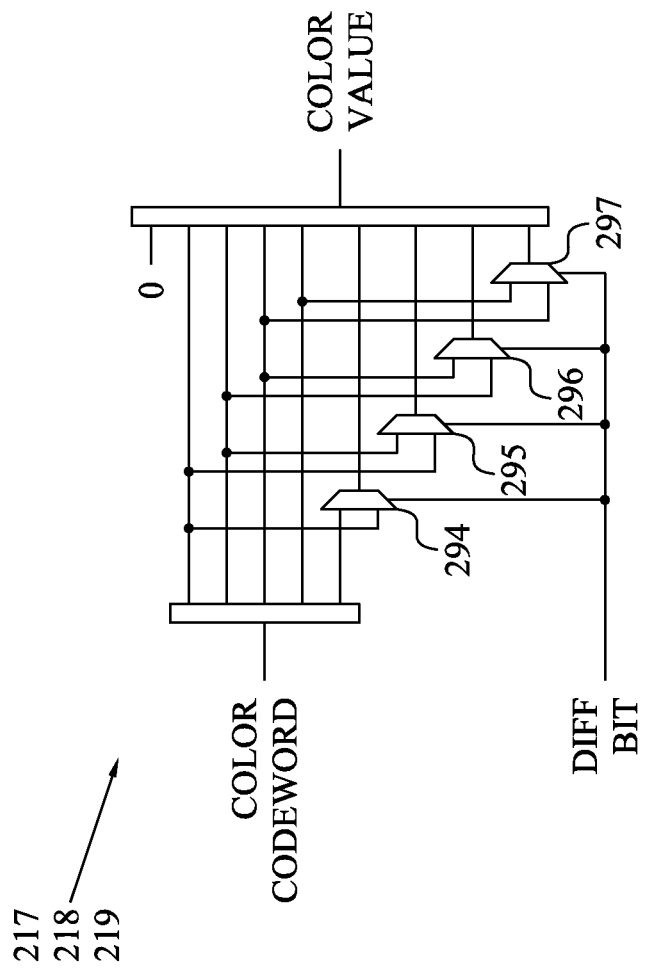
FIG. 16 is a hardware implementation of the extenders of the processing system in FIG. 10 according to an embodiment.

FIG. 16 is an illustration of a hardware implementation of the extenders 217, 218, 219 of the processing system according to an embodiment. The input to the extenders 217, 218, 219 is the 4-bit color codeword in the normal mode or the 5-bit first color codeword or sum of the first and second color codewords in the differential mode. A first multiplexor 294 selects between the most significant bit of the 4-bit/5-bit input and the least significant bit of a 5-bit input. In the normal mode the multiplexor 294 will select the most significant bit. In the differential mode the multiplexor 294 outputs the least significant bit. The multiplexor output will be the sixth most significant bit in the 9-bit output from the extender 217, 218, 219.

A second multiplexor 295 selects between the most significant bit and the second most significant bit in the input 4-bit/5-bit word. In the differential mode it outputs the most significant bit and in the normal mode the second most significant bit. This output will be the seventh most significant bit in the 9-bit output.

A third multiplexor 296 selects between the second most significant bit and the third most significant bit in the input 4-bit/5-bit word. In the differential mode it outputs the second most significant bit and in the normal mode the third most significant bit. This output will be the eight most significant bit in the 9-bit output.

A fourth multiplexor 297 selects between the third most significant bit and the fourth most significant bit in the input 4-bit/5-bit word. In the differential mode it outputs the third most significant bit and in the normal mode the fourth most significant bit, which is actually the least most significant bit the 4-bit input word. This output will be the least significant bit in the 9-bit output.

The most significant bit of the 9-bit output is set to $0_{bin}$ and the second to fifth most significant bits of the output corresponds to the four most significant bits of the input word.

The above presented hardware implementation should merely be seen as an illustrative but non-limiting example disclosing that the processing system can efficiently be implemented in hardware.

Various modifications to the illustrated embodiments in which different operators and gates are replaced by other hardware operators and gates that perform the same function are possible and within the scope of the embodiments.

The description herein has been directed towards a texel block having two texel sub-blocks. The embodiments are, however, not limited thereto but can comprise more than two sub-blocks. In such a case, a respective value codeword and table codeword is preferably determined for each texel sub-block. However, in most practical implementations it is preferred to use two texel sub-blocks per texel block as disclosed herein.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] U.S. Pat. No. 5,956,431
[2] Ström and Akenine-Möller, "iPACKMAN: High-Quality, Low-Complexity Texture Compression for Mobile Phones", In HWWS '05: Proceedings of the ACM SIGGRAPH/EUROGRAPHICS conference on Graphics Hardware (2005), ACM Press, New York, N.Y., USA, 63-70

The invention claimed is:

1. A computer-implemented method of compressing a texel block consisting of a first texel sub-block comprising multiple texels and a second texel sub-block comprising multiple texels, said computer-implemented method executable on one or more processors and comprising:
   determining, based on texel values of at least a portion of said multiple texels of said texel block, a first value codeword that is a representation of a first base texel value for said multiple texels in said first texel sub-block;
   determining, based on texel values of at least a portion of said multiple texels of said texel block, a second value codeword that is a representation of a second base texel value for said multiple texels in said second texel sub-block;
   providing, for said first texel sub-block, a first table codeword that is a representation of a first modifier set of multiple value modifiers for modifying said first base texel value;
   providing a second table codeword for said second texel sub-block;
   selecting, for each texel in said first texel sub-block, a texel index associated with a value modifier of said first modifier set or indicating that a base texel value for said texel is based on said second base texel value, wherein a respective texel index is selected for at least one texel in said first texel sub-block to indicate that said base texel value for said texel is based on said second base texel value;
   selecting, for each texel in said second texel sub-block, a texel index; and
   storing at a memory a compressed representation of said texel block comprising said first value codeword, said second value codeword, said first table codeword, said second table codeword and said texel indices.

2. The method according to claim 1, wherein providing said second table codeword comprises providing, for said second texel sub-block, a second table codeword that is a representation of a second modifier set of multiple value modifiers for modifying said second base texel value.

3. The method according to claim 2, wherein selecting texel index for each texel in said second texel sub-block comprises selecting, for each texel in said second texel sub-block, a texel index associated with a value modifier of said second modifier set or indicating that a base texel value for said texel is based on said first base texel value.

4. The method according to claim 2, wherein selecting texel index for each texel in said second texel sub-block comprises selecting, for each texel in said second texel sub-block, a texel index associated with a value modifier of said second modifier set.

5. The method according to claim 1, wherein providing said second table codeword comprises providing, for said second texel sub-block, a second table codeword that indicates that said first value codeword is to be used a value codeword for said second texel sub-block and said first table codeword is to be used as table codeword for said second texel sub-block.

6. The method according to claim 1, wherein selecting texel index for each texel in said first texel sub-block comprises selecting, for each texel in said first texel sub-block, a texel index associated with a value modifier of said first modifier set or indicating that said second base texel value is used as said base texel value of said texel.

7. The method according to claim 1, wherein selecting texel index for each texel in said first texel sub-block comprises selecting, for each texel in said first texel sub-block, a texel index associated with a value modifier of said first modifier set or indicating that said base texel value of said texel is based on a defined combination of said second base texel value and said first base texel value.

8. The method according to claim 1, wherein selecting texel index for each texel in said first texel sub-block comprises selecting, for each texel in said first texel sub-block, a texel index associated with a value modifier of said first modifier set or indicating that said second base texel value modified with a defined value modifier is used as said base texel value for said texel.

9. The method according to claim 1, wherein
   determining said first value codeword comprises determining, based on colors of at least a portion of said multiple texels of said texel block, a first color codeword that is a representation of a first base color for said multiple texels in said first texel sub-block;

determining said second value codeword comprises determining, based on colors of at least a portion of said multiple texels of said texel block, a second color codeword that is a representation of a second base color for said multiple texels in said second texel sub-block;

providing said first table codeword comprises providing, for said first texel sub-block, a first table codeword that is a representation of a first modifier set of multiple intensity modifiers for modifying the intensity of said first base color;

selecting texel indices for each texel in said first texel sub-block comprises selecting, for each texel in said first texel sub-block, a texel index associated with an intensity modifier of said first modifier set or indicating that a base color for said texel is based on said second base color; and storing said compressed representation comprises storing a compressed representation of said texel block comprising said first color codeword, said second color codeword, said first table codeword, said second table codeword and said texel indices.

10. A system for compressing a texel block consisting of a first texel sub-block comprising multiple texels and a second texel sub-block comprising multiple texels, said system comprising:

a value codeword determiner configured to determine, based on texel values of at least a portion of said multiple texels of said texel block, a first value codeword that is a representation of a first base texel value for said multiple texels in said first texel sub-block and determine, based on texel values of at least a portion of said multiple texels of said texel block, a second value codeword that is a representation of a second base texel value for said multiple texels in said second texel sub-block;

a table codeword provider configured to provide, for said first texel sub-block, a first table codeword that is a representation of a first modifier set of multiple value modifiers for modifying said first base texel value and provide a second table codeword for said second texel sub-block;

a texel index selector configured to select, for each texel in said first texel sub-block, a texel index associated with a value modifier of said first modifier set or indicating that a base texel value for said texel is based on said second base texel value and select, for each texel in said second texel sub-block, a texel index, wherein said texel index selector is configured to select a respective texel index for at least one texel in said first texel sub-block to indicate that said base texel value for said texel is based on said second base texel value; and a memory configured to store a compressed representation of said texel block comprising said first value codeword, said second value codeword, said first table codeword, said second table codeword and said texel indices.

11. The system according to claim 10, wherein said table codeword provider is configured to provide, for said second texel sub-block, a second table codeword that is a representation of a second modifier set of multiple value modifiers for modifying said second base texel value.

12. The system according to claim 11, wherein said texel index selector is configured to select, for each texel in said second texel sub-block, a texel index associated with a value modifier of said second modifier set or indicating that a base texel value for said texel is based on said first base texel value.

13. The system according to claim 11, wherein said texel index selector is configured to select, for each texel in said second texel sub-block, a texel index associated with a value modifier of said second modifier set.

14. The system according to claim 10, wherein said table codeword provider is configured to provide, for said second texel sub-block, said second table codeword that indicates that said first value codeword is to be used a value codeword for said second texel sub-block and said first table codeword is to be used as table codeword for said second texel sub-block.

15. The system according to claim 10, wherein said texel index selector is configured to select, for each texel in said first texel sub-block, a texel index associated with a value modifier of said first modifier set or indicating that said second base texel value is used as said base texel value for said texel.

16. The system according to claim 10, wherein said texel index selector is configured to select, for each texel in said first texel sub-block, a texel index associated with a value modifier of said first modifier set or indicating that said base texel value for said texel is based on a defined combination of said second base texel value and said first base texel value.

17. The system according to claim 10 said texel index selector is configured to select, for each texel in said first texel sub-block, a texel index associated with a value modifier of said first modifier set or indicating that said second base texel value modified with a defined value modifier is used as said base texel value for said texel.

* * * * *

UNITED STATES PATENT AND TRADEMARK OFFICE
CERTIFICATE OF CORRECTION

| | | |
|---|---|---|
| PATENT NO. | : 9,129,543 B2 | Page 1 of 1 |
| APPLICATION NO. | : 13/805122 | |
| DATED | : September 8, 2015 | |
| INVENTOR(S) | : Ström et al. | |

It is certified that error appears in the above-identified patent and that said Letters Patent is hereby corrected as shown below:

On the Title Page, in item (73), under "Assignee", in Column 1, Line 1, delete "Telefonaktie" and insert -- Telefonaktiebolaget --, therefor.

On the Title Page, in item (57), under "ABSTRACT", in Column 2, Line 2, delete "bocks" and insert -- blocks --, therefor.

In the Specification

In Column 3, Line 47, delete "is flow" and insert -- is a flow --, therefor.

In Column 8, Line 19, delete "codwords" and insert -- codewords --, therefor.

In Column 13, Line 24, delete "codwords" and insert -- codewords --, therefor.

In Column 23, Line 50, delete "processing system 100." and insert -- processing system 200. --, therefor.

In Column 23, Line 60, delete "processing system 100" and insert -- processing system 200 --, therefor.

In Column 26, Line 34, delete "is hardware" and insert -- is a hardware --, therefor.

In the Claims

In Column 30, Line 49, in Claim 6, delete "value of" and insert -- value for --, therefor.

Signed and Sealed this
Sixteenth Day of February, 2016

Michelle K. Lee
*Director of the United States Patent and Trademark Office*